US012225368B2

(12) United States Patent
Davis

(10) Patent No.: US 12,225,368 B2
(45) **Date of Patent: *Feb. 11, 2025**

(54) AUDIO CHANNEL SPATIAL TRANSLATION

(71) Applicant: Dolby Laboratories Licensing Corporation, San Francisco, CA (US)

(72) Inventor: Mark F. Davis, Pacifica, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/474,170

(22) Filed: Sep. 25, 2023

(65) Prior Publication Data

US 2024/0098438 A1 Mar. 21, 2024

Related U.S. Application Data

(63) Continuation of application No. 17/860,863, filed on Jul. 8, 2022, now Pat. No. 11,805,379, which is a continuation of application No. 17/136,348, filed on Dec. 29, 2020, now Pat. No. 11,395,085, which is a continuation of application No. 16/439,670, filed on Jun. 12, 2019, now Pat. No. 10,887,715, which is a continuation of application No. 16/162,192, filed on Oct. 16, 2018, now Pat. No. 10,469,970, which is a continuation of application No. 15/487,358, filed on (Continued)

(51) Int. Cl.

| | |
|---|---|
| ***H04R 5/00*** | (2006.01) |
| ***H04S 3/02*** | (2006.01) |
| ***H04S 5/00*** | (2006.01) |
| ***H04S 5/02*** | (2006.01) |

(52) U.S. Cl.

CPC ................ *H04S 5/005* (2013.01); *H04S 3/02* (2013.01); *H04S 2400/03* (2013.01)

(58) Field of Classification Search

CPC ..... G10L 19/008; G10L 19/167; H04S 3/008; H04S 2400/01; H04S 3/02; H04S 2400/03

USPC .................................. 381/17–19, 20–23, 119

See application file for complete search history.

(56) References Cited

U.S. PATENT DOCUMENTS

| | | | |
|---|---|---|---|
| 4,799,260 A | | 1/1989 | Mandell et al. |
| 6,628,787 B1 | | 9/2003 | McGrath |

(Continued)

FOREIGN PATENT DOCUMENTS

| | | |
|---|---|---|
| CN | 1524399 | 8/2004 |
| CN | 1672464 | 9/2005 |

OTHER PUBLICATIONS

Digital Audio Compression Standard (AC-3, E-AC-3), Revision B, Advanced Television Systems Committe, p. 2, Jun. 14, 2005.

*Primary Examiner* — George C Monikang

(57) ABSTRACT

The present invention is directed to methods and apparatus for translating a first plurality of audio input channels to a second plurality of audio output channels. This includes determining that there is pair-wise coding among any of the first plurality of audio input channels, determining an input/output-mapping matrix for mapping at least a first set of the first plurality of audio input channels to at least a second set of the second plurality of audio output channels; and deriving the second plurality of audio output channels based on first plurality of audio input channels, the input/output-mapping matrix and the determined pair-wise coding. The first plurality of audio input channels represent the same soundfield represented by the second plurality of audio output channels.

3 Claims, 15 Drawing Sheets

Related U.S. Application Data

Apr. 13, 2017, now Pat. No. 10,104,488, which is a continuation of application No. 13/139,984, filed as application No. PCT/US2009/068334 on Dec. 16, 2009, now Pat. No. 9,628,934.

(60) Provisional application No. 61/138,823, filed on Dec. 18, 2008.

(56) References Cited

U.S. PATENT DOCUMENTS

| | | | |
|---|---|---|---|
| 7,660,424 | B2 | 2/2010 | Davis |
| 2004/0125967 | A1 | 7/2004 | Eid |
| 2004/0223620 | A1 | 11/2004 | Horbach |
| 2005/0175197 | A1 | 8/2005 | Melchior |
| 2005/0276420 | A1 | 12/2005 | Davis |
| 2007/0024832 | A1 | 2/2007 | Owa |
| 2008/0097750 | A1 | 4/2008 | Seefeldt et al. |
| 2008/0292112 | A1 | 11/2008 | Valenzuela |

AUDIO CHANNEL SPATIAL TRANSLATION

CROSS REFERENCE TO RELATED APPLICATIONS

This application is a continuation of U.S. patent application Ser. No. 17/860,863, filed Jul. 8, 2022, which is a continuation of U.S. patent application Ser. No. 17/136,348, filed Dec. 29, 2020, which is a continuation of U.S. patent application Ser. No. 16/439,670, filed Jun. 12, 2019, now Pat. No. 10,887,715, which is a continuation of U.S. patent application Ser. No. 16/162,192, filed Oct. 16, 2018, now Pat. No. 10,469,970, which is a continuation of U.S. patent application Ser. No. 15/487,358, filed Apr. 13, 2017, now Pat. No. 10,104,488, which is a continuation of U.S. patent application Ser. No. 13/139,984, Jun. 15, 2011, now U.S. Pat. No. 9,628,934, which is the U.S. National Stage Application of PCT Application No. PCT/US2009/068334, filed Dec. 16, 2009, which claims priority to U.S. Provisional Application No. 61/138,823, filed Dec. 18, 2008, each of which is incorporated by reference in its entirety.

TECHNICAL FIELD

The invention relates to audio signal processing. More particularly the invention relates to translating a plurality of audio input channels representing a soundfield to one or a plurality of audio output channels representing the same soundfield, wherein each channel is a single audio stream representing audio arriving from a direction.

BACKGROUND ART

Although humans have only two ears, we hear sound as a three dimensional entity, relying upon a number of localization cues, such as head related transfer functions (HRTFs) and head motion. Full fidelity sound reproduction therefore requires the retention and reproduction of the full 3D soundfield, or at least the perceptual cues thereof. Unfortunately, sound recording technology is not oriented toward capture of the 3D soundfield, nor toward capture of a 2D plane of sound, nor even toward capture of a 1D line of sound. Current sound recording technology is oriented strictly toward capture, preservation, and presentation of zero dimensional, discrete channels of audio.

Most of the effort on improving fidelity since Edison's original invention of sound recording has focused on ameliorating the imperfections of his original analog modulated-groove cylinder/disc media. These imperfections included limited, uneven frequency response, noise, distortion, wow, flutter, speed accuracy, wear, dirt, and copying generation loss. Although there were any number of piecemeal attempts at isolated improvements, including electronic amplification, tape recording, noise reduction, and record players that cost more than some cars, the traditional problems of individual channel quality were arguably not finally resolved until the singular development of digital recording in general, and specifically the introduction of the audio Compact Disc. Since then, aside from some effort at further extending the quality of digital recording to 24bits/96 kHz sampling, the primary efforts in audio reproduction research have been focused on reducing the amount of data needed to maintain individual channel quality, mostly using perceptual coders, and on increasing the spatial fidelity. The latter problem is the subject of this document.

Efforts on improving spatial fidelity have proceeded along two fronts: trying to convey the perceptual cues of a full sound field, and trying to convey an approximation to the actual original sound field. Examples of systems employing the former approach include binaural recording and two-speaker-based virtual surround systems. Such systems exhibit a number of unfortunate imperfections, especially in reliably localizing sounds in some directions, and in requiring the use of headphones or a fixed single listener position.

For presentation of spatial sound to multiple listeners, whether in a living room or a commercial venue like a movie theatre, the only viable alternative has been to try to approximate the actual original sound field. Given the discrete channel nature of sound recording, it is not surprising that most efforts to date have involved what might be termed conservative increases in the number of presentation channels. Representative systems include the panned-mono three-speaker film soundtracks of the early 50's, conventional stereo sound, quadraphonic systems of the 60's, five channel discrete magnetic soundtracks on 70 mm films, Dolby surround using a matrix in the 70's, AC-3 5.1 channel sound of the 90's, and recently, Surround-EX 6.1 channel sound. "Dolby", "Pro Logic" and "Surround EX" are trademarks of Dolby Laboratories Licensing Corporation. To one degree or another, these systems provide enhanced spatial reproduction compared to monophonic presentation. However, mixing a larger number of channels incurs larger time and cost penalties on content producers, and the resulting perception is typically one of a few scattered, discrete channels, rather than a continuum soundfield. Aspects of Dolby Pro Logic decoding are described in U.S. Pat. No. 4,799,260, which patent is incorporated by reference herein in its entirety. Details of AC-3 are set forth in "Digital Audio Compression Standard (AC-3, E-AC-3), Revision B," Advanced Television Systems Committee, 14 Jun. 2005.

Once the sound field is characterized, it is possible in principle for a decoder to derive the optimal signal feed for any output loudspeaker. The channels supplied to such a decoder will be referred to herein variously as "cardinal," "transmitted," and "input" channels, and any output channel with a location that does not correspond to the position of one of the input channels will be referred to as an "intermediate" channel. An output channel may also have a location coincident with the position of an input channel.

BACKGROUND OF THE INVENTION

Encoding or Downmixing

According to an encoding or downmixing aspect of the present invention, a process for translating M audio input channels, each associated with a spatial direction, to N audio output channels, each associated with a spatial direction, wherein M and N are positive whole integers, M is three or more, and N is three or more, comprises deriving the N audio output channels from the M audio input channels, wherein one or more of the M audio input channels is associated with a spatial direction other than a spatial direction with which any of the N audio output channels is associated, at least one of the one or more of the M audio input channels being mapped to a respective set of at least three of the N output channels. The at least three output channels of a set may be associated with contiguous spatial directions. N may be five or more and the deriving may map the at least one of the one or more of the M audio input channels to a respective set of three, four, or five of the N output channels. The at least three, four, or five of the N output channels of a set may be associated with contiguous spatial directions.

In specific embodiments, M may be at least six, N may be at least five, and the M audio input channels may be associated, respectively, with five spatial directions corresponding to five spatial directions associated with the N audio output channels and at least one spatial direction not associated with the N audio output channels.

Each of the N audio output channels may be associated with a spatial direction in a common plane. At least one of the associated spatial directions of the M audio input channels may be above the plane or below the plane with which the N audio output channels are associated. At least some of the associated spatial directions of the M audio input channels may vary in distance with respect to a reference spatial direction.

In specific embodiments, the spatial directions with which the N audio output channels are associated may include left, center, right, left surround and right surround. The spatial directions with which the M audio input channels are associated may include left, center, right, left surround, right surround, left front elevated, center front elevated, right front elevated, left surround elevated, center surround elevated, and right surround elevated. The spatial directions with which the M audio input channels are associated may further include top elevated.

Decoding or Upmixing

According to an decoding or upmixing aspect of the present invention, a process for translating N audio input channels, each associated with a spatial direction, to M audio output channels, each associated with a spatial direction, wherein M and N are positive whole integers, N is three or more, and M is one or more, comprises deriving the M audio output channels from the N audio input channels, wherein one or more of the M audio output channels is associated with a spatial direction other than a spatial direction with which any of the N audio input channels is associated, at least one of the one or more of the M audio output channels being derived from a respective set of at least three of the N input channels. At least one of the one or more of the M audio output channels may be derived from a respective set of at least three of the N input channels at least in part by approximating the cross-correlation of the at least three of the N input channels. Approximating the cross-correlation may include calculating the common energy for each pair of the at least three of the N input channels. The common energy for any of the pairs may have a minimum value. The amplitude of the derived M audio output channel may be based on the lowest estimated amplitude of the common energy of any pair of the at least three of the N input channels. The amplitude of the derived M audio output channel may be taken to be zero when the common energy for any pair of the at least three of the N input channels is zero.

A plurality of derived M audio output channels may be derived from respective sets N input channels that share a common pair of N input channels, wherein calculating the common energy may include compensating for the common energy of shared common pairs of N input channels.

The approximating may include processing the plurality of derived M audio channels in a hierarchical order such that each derived audio channel may be ranked according to the number of input channels from which it is derived, the greatest number of input channels having the highest ranking, the approximating processing the plurality of derived M audio channels in order according to their hierarchical order.

Calculating the common energy may further include compensating for the common energy of shared common pairs of N input channels relating to derived audio channels having a higher hierarchical ranking.

At least three of the N input channels of a set may be associated with contiguous spatial directions.

N may be five or more and the deriving may map the at least one of the one or more of the M audio input channels to a respective set of three, four, or five of the N input channels. At least three, four, or five of the N input channels of a set may be associated with contiguous spatial directions.

In specific embodiments, M may be at least six, N may be five, and the at least six output audio input channels may be associated, respectively, with five spatial directions corresponding to five spatial directions associated with the N audio input channels and at least one spatial direction not associated with the N audio input channels.

Each of the N audio input channels may be associated with a spatial direction in a common plane. At least one of the associated spatial directions of the M audio input channels may be above the plane or below the plane with which the N audio output channels are associated. At least some of the associated spatial directions of the M audio input channels may vary in distance with respect to a reference spatial direction.

In specific embodiments, the spatial directions with which the N audio output channels are associated may include left, center, right, left surround and right surround. The spatial directions with which the M audio output channels are associated may include left, center, right, left surround, right surround, left front elevated, center front elevated, right front elevated, left surround elevated, center surround elevated, and right surround elevated. The spatial directions with which the N audio input channels are associated may further include top elevated.

According to a first aspect of other aspects of the invention, a process for translating M audio input signals, each associated with a direction, to N audio output signals, each associated with a direction, wherein N is larger than M, M is two or more and N is a positive integer equal to three or more, comprises providing an M:N variable matrix, applying the M audio input signals to the variable matrix, deriving the N audio output signals from the variable matrix, and controlling the variable matrix in response to the input signals so that a soundfield generated by the output signals has a compact sound image in the direction of the nominal ongoing primary direction of the input signals when the input signals are highly correlated, the image spreading from compact to broad as the correlation decreases and progressively splitting into multiple compact sound images, each in a direction associated with an input signal, as the correlation continues to decrease to highly uncorrelated.

According to this first aspect of other aspects of the invention, the variable matrix may be controlled in response to measures of: (1) the relative levels of the input signals, and (2) the cross-correlation of the input signals. In that case, for a measure of cross-correlation of the input signals having values in a first range, bounded by a maximum value and a reference value, the soundfield may have a compact sound image when the measure of cross-correlation is the maximum value and may have a broadly spread image when the measure of cross-correlation is the reference value, and for a measure of cross-correlation of the input signals having values in a second range, bounded by the reference value and a minimum value, the soundfield may have the broadly spread image when the measure of cross-correlation is the reference value and may have a plurality of compact sound images, each in a direction associated with an input signal, when the measure of cross correlation is the minimum value.

According to a further aspect of other aspects of the present invention, a process for translating M audio input signals, each associated with a direction, to N audio output signals, each associated with a direction, wherein N is larger than M, and M is three or more, comprises providing a plurality of m:n variable matrices, where m is a subset of M and n is a subset of N, applying a respective subset of the M audio input signals to each of the variable matrices, deriving a respective subset of the N audio output signals from each of the variable matrices, controlling each of the variable matrices in response to the subset of input signals applied to it so that a soundfield generated by the respective subset of output signals derived from it has a compact sound image in the direction of the nominal ongoing primary direction of the subset of input signals applied to it when such input signals are highly correlated, the image spreading from compact to broad as the correlation decreases and progressively splitting into multiple compact sound images, each in a direction associated with an input signal applied to it, as the correlation continues to decrease to highly uncorrelated, and deriving the N audio output signals from the subsets of N audio output channels.

According to this further aspect of other aspects of the present invention, the variable matrices may also be controlled in response to information that compensates for the effect of one or more other variable matrices receiving the same input signal. Furthermore, deriving the N audio output signals from the subsets of N audio output channels may also include compensating for multiple variable matrices producing the same output signal. According to such further aspects of other aspects of the present invention, each of the variable matrices may be controlled in response to measures of: (a) the relative levels of the input signals applied to it, and (b) the cross-correlation of the input signals.

According to yet a further aspect of other aspects of the present invention, a process for translating M audio input signals, each associated with a direction, to N audio output signals, each associated with a direction, wherein N is larger than M, and M is three or more, comprises providing an M:N variable matrix responsive to scale factors that control matrix coefficients or control the matrix outputs, applying the M audio input signals to the variable matrix, providing a plurality of m:n variable matrix scale factor generators, where m is a subset of M and n is a subset of N, applying a respective subset of the M audio input signals to each of the variable matrix scale factor generators, deriving a set of variable matrix scale factors for respective subsets of the N audio output signals from each of the variable matrix scale factor generators, controlling each of the variable matrix scale factor generators in response to the subset of input signals applied to it so that when the scale factors generated by it are applied to the M:N variable matrix, a soundfield generated by the respective subset of output signals produced has a compact sound image in the nominal ongoing primary direction of the subset of input signals that produced the applied scale factors when such input signals are highly correlated, the image spreading from compact to broad as the correlation decreases and progressively splitting into multiple compact sound images, each in a direction associated with an input signal that produced the applied scale factors, as the correlation continues to decrease to highly uncorrelated, and deriving the N audio output signals from the variable matrix.

According to this yet further aspect of other aspects of the present invention, the variable matrix scale factor generators may also be controlled in response to information that compensates for the effect of one or more other variable matrix scale factor generators receiving the same input signal. Furthermore, deriving the N audio output signals from the variable matrix may include compensating for multiple variable matrix scale factor generators producing scale factors for the same output signal. According to such yet further aspects of other aspects of the present invention each of the variable matrix scale factor generators may be controlled in response to measures of: (a) the relative levels of the input signals applied to it, and (b) the cross-correlation of the input signals.

As used herein, a "channel" is a single audio stream representing or associated with audio arriving from a direction (e.g., azimuth, elevation, and, optionally, distance, to allow for a closer or more distant virtual or projected channel).

In accordance with the present invention, M audio input channels representing a soundfield are translated to N audio output channels representing the same soundfield, wherein each channel is a single audio stream represents audio arriving from a direction, M and N are positive whole integers, and M is at least 2 and N is at least 3, and N is larger than M. One or more sets of output channels are generated, each set having one or more output channels. Each set is usually associated with two or more spatially adjacent input channels and each output channel in a set is generated by determining a measure of the cross-correlation of the two or more input channels and a measure of the level interrelationships of the two or more input channels. The measure of cross-correlation preferably is a measure of the zero-time-offset cross-correlation, which is the ratio of the common energy level with respect to the geometric mean of the input signal energy levels. The common energy level preferably is the smoothed or averaged common energy level and the input signal energy levels are the smoothed or averaged input signal energy levels.

In one aspect of the present invention, multiple sets of output channels may be associated with more than two input channels and a process may determine the correlation of input channels, with which each set of output channels is associated, according to a hierarchical order such that each set or sets is ranked according to the number of input channels with which its output channel or channels are associated, the greatest number of input channels having the highest ranking, and the processing processes sets in order according to their hierarchical order. Further according to an aspect of the present invention, the processing takes into account the results of processing higher order sets.

Certain playback or decoding aspects of the present invention assume that each of the M audio input channels representing audio arriving from a direction was generated by a passive-matrix nearest-neighbor amplitude-panned encoding of each source direction (i.e., a source direction is assumed to map primarily to the nearest input channel or channels), without the requirement of additional side chain information (the use of side chain or auxiliary information is optional), making it compatible with existing mixing techniques, consoles, and formats. Although such source signals may be generated by explicitly employing a passive encoding matrix, most conventional recording techniques inherently generate such source signals (thus, constituting an "effective encoding matrix"). Certain playback or decoding aspects of the present invention are also largely compatible with natural recording source signals, such as might be made with five real directional microphones, since, allowing for some possible time delay, sounds arriving from intermediate directions tend to map principally to the nearest microphones (in a horizontal array, specifically to the nearest pair of microphones).

A decoder or decoding process according to aspects of the present invention may be implemented as a lattice of coupled processing modules or modular functions (hereinafter, "modules" or "decoding modules"), each of which is used to generate one or more output channels (or, alternatively, control signals usable to generate one or more output channels), typically from the two or more of the closest spatially adjacent input channels associated with the decoding module. The output channels typically represent relative proportions of the audio signals in the closest spatially adjacent input channels associated with the particular decoding module. As explained in more detail below, the decoding modules are loosely coupled to each other in the sense that modules share inputs and there is a hierarchy of decoding modules. Modules are ordered in the hierarchy according to the number of input channels they are associated with (the module or modules with the highest number of associated input channels is ranked highest). A supervisor or supervisory function presides over the modules so that common input signals are equitably shared between or among modules and higher-order decoder modules may affect the output of lower-order modules.

Each decoder module may, in effect, include a matrix such that it directly generates output signals or each decoder module may generate control signals that are used, along with the control signals generated by other decoder modules, to vary the coefficients of a variable matrix or the scale factors of inputs to or outputs from a fixed matrix in order to generate all of the output signals.

Decoder modules emulate the operation of the human ear to attempt to provide perceptually transparent reproduction. Signal translation according to the present invention, of which decoder modules and module functions are an aspect, may be applied either to wideband signals or to each frequency band of a multiband processor, and depending on implementation, may be performed once per sample or once per block of samples. A multiband embodiment may employ either a filter bank, such as a discrete critical-band filterbank or a filterbank having a band structure compatible with an associated decoder, or a transform configuration, such as an FFT (Fast Fourier Transform) or MDCT (Modified Discrete Cosine Transform) linear filterbank.

Another aspect of this invention is that the quantity of speakers receiving the N output channels can be reduced to a practical number by judicious reliance upon virtual imaging, which is the creation of perceived sonic images at positions in space other than where a loudspeaker is located. Although the most common use of virtual imaging is in the stereo reproduction of an image part way between two speakers, by panning a monophonic signal between the channels, virtual imaging, as contemplated as an aspect of the present invention, may include the rendering of phantom projected images that provide the auditory impression of being beyond the walls of a room or inside the walls of a room. Virtual imaging is not considered a viable technique for group presentation with a sparse number of channels, because it requires the listener to be equidistant from the two speakers, or nearly so. In movie theatres, for example, the left and right front speakers are too far apart to obtain useful phantom imaging of a center image to much of the audience, so, given the importance of the center channel as the source of much of the dialog, a physical center speaker is used instead.

As the density of the speakers is increased, a point will be reached where virtual imaging is viable between any pair of speakers for much of the audience, at least to the extent that pans are smooth; with sufficient speakers, the gaps between the speakers are no longer perceived as such.

Signal Distribution

As mentioned above, a measure of cross-correlation determines the ratio of dominant (common signal components) to non-dominant (non-common signal components) energy in a module and the degree of spreading of the non-dominant signal components among the output channels of the module. This may be better understood by considering the signal distribution to the output channels of a module under different signal conditions for the case of a two-input module. Unless otherwise noted, the principles set forth extend directly to higher order modules.

The problem with signal distribution is that there is often too little information to recover the original signal amplitude distribution, much less the signals themselves. The basic information available is the signal levels at each module input and the averaged cross product of the input signals, the common energy level. The zero-time offset cross-correlation is the ratio of the common energy level with respect to the geometric mean of the input signal energy levels.

The significance of cross-correlation is that it functions as a measure of the net amplitude of signal components common to all inputs. If there is a single signal panned anywhere between the inputs of the module (an "interior" or "intermediate" signal), all the inputs will have the same waveform, albeit with possibly different amplitudes, and under these conditions, the correlation will be 1.0. At the other extreme, if all the input signals are independent, meaning there is no common signal component, the correlation will be zero. Values of correlation intermediate between 0 and 1.0 can be considered to correspond to intermediate balance levels of some single, common signal component and independent signal components at the inputs. Consequently, any input signal condition may be divided into a common signal, the "dominant" signal, and input signal components left over after subtracting common signal contributions, comprising, an "all the rest" signal component (the "non-dominant" or residue signal energy). As noted above, the common or "dominant" signal amplitude is not necessarily louder than the residue or non-dominant signal levels.

For example, consider the case of an arc of five channels (L (Left), MidL (Mid-Left), C (Center), MidR (Mid-Right), R (Right)) mapped to a single Lt/Rt (left total and right total) pair in which it is desired to recover the original five channels. If all five channels have equal amplitude independent signals, then Lt and Rt will be equal in amplitude, with an intermediate value of common energy, corresponding to an intermediate value of cross-correlation between zero and one (because Lt and Rt are not independent signals). The same levels can be achieved with appropriately chosen levels of L, C, and R, with no signals from MidL and MidR. Thus, a two-input, five-output module might feed only the output channel corresponding to the dominant direction (C in this case) and the output channels corresponding to the input signal residues (L, R) after removing the C energy from the Lt and Rt inputs, giving no signals to the MidL and MidR output channels. Such a result is undesirable—turning off a channel unnecessarily is almost always a bad choice, because small perturbations in signal conditions will cause the "off" channel to toggle between on and off, causing an annoying chattering sound ("chattering" is a channel rapidly turning on and off), especially when the "off" channel is listened to in isolation.

Consequently, when there are multiple possible output signal distributions for a given set of module input signal values, the conservative approach from the point of view of individual channel quality is to spread the non-dominant signal components as evenly as possible among the module's output channels, consistent with the signal conditions. An aspect of the present invention is evenly spreading the available signal energy, subject to the signal conditions, according to a three-way split rather than a "dominant" versus "all the rest" two-way split. Preferably, the three-way split comprises dominant (common) signal components, fill (even-spread) signal components, and input signal components residue. Unfortunately, there is only enough information to make a two-way split (dominant signal components and all other signal components). One suitable approach for realizing a three-way split is described herein in which for correlation values above a particular value, the two-way split employs the dominant and spread non-dominant signal components; for correlation values below that value, the two-way split employs the spread non-dominant signal components and the residue. The common signal energy is split between "dominant" and "even-spread". The "even-spread" component includes both "common" and "residue" signal components. Therefore, "spreading" involves a mixture of common (correlated) and residue (uncorrelated) signal components.

Before processing, for a given input/output channel configuration of a given module, a correlation value is calculated corresponding to all output channels receiving the same signal amplitude. This correlation value may be referred to as the "random_xcor" value. For a single, centered-derived intermediate-output channel and two input channels, the random-xcor value may calculate as 0.333. For three equally spaced intermediate channels and two input channels, the random-xcor value may calculate as 0.483. Although such time values have been found to provide satisfactory results, they are not critical. For example, values of about 0.3 and 0.5, respectively, are usable. In other words, for a module with M inputs and N outputs, there is a particular degree of correlation of the M inputs that can be considered as representing equal energies in all N outputs. This can be arrived at by considering the M inputs as if they had been derived using a passive N to M matrix receiving N independent signals of equal energy, although of course the actual inputs may be derived by other means. This threshold correlation value is "random_xcor", and it may represent a dividing line between two regimes of operation.

Then, during processing, if the cross-correlation value of a module is greater than or equal to the random_xcor value, it is scaled to a range of 1.0 to 0:

scaled_xcor=(correlation-random_xcor)/(1-random_xcor)

The "scaled_xcor" value represents the amount of dominant signal above the even-spread level. Whatever is left over may be distributed equally to the other output channels of the module.

However, there is an additional factor that should be accounted for, namely that as the nominal ongoing primary direction of the input signals becomes progressively more off-center, the amount of spread energy should either be progressively reduced if equal distribution to all output channels is maintained or, alternatively, the amount of spread energy should be maintained but the energy distributed to output channels should be reduced in relation to the "off centeredness" of the dominant energy—in other words, a tapering of the energy along the output channels. In the latter case, additional processing complexity may be required to maintain the output power equal to the input power. It will be noted that some references to "power" herein should, from a strict viewpoint, refer to "energy." References to "power" are commonly employed in the literature.

If, on the other hand, the current correlation value is less than the random-xcor value, the dominant energy is considered to be zero, the evenly-spread energy is progressively reduced, and the residue signal, whatever is left over, is allowed to accumulate at the inputs. At correlation=zero, there is no interior signal, just independent input signals that are mapped directly to output channels.

The operation of this aspect of the invention may be explained further as follows:

a) When the actual correlation is greater than random_xcor, there is enough common energy to consider there to be a dominant signal to be steered (panned) between two adjacent outputs (or, of course, fed to one output if its direction happens to coincide with that one output); the energy assigned to it is subtracted from the inputs to give residues which are distributed (preferably uniformly) among all the outputs.

b) When the actual correlation is precisely random_xcor, the input energy (which might be thought as all residue) is distributed uniformly among all the outputs (this is the definition of random_xcor).

c) When the actual correlation is less than random_xcor, there is not enough common energy for a dominant signal, so the energy of the inputs is distributed among the outputs with proportions dependent on how much less. This is as if one treated the correlated part as the residue, to be uniformly distributed among all outputs, and the uncorrelated part rather like a number of dominant signals to be sent to outputs corresponding to the directions of the inputs. In the extreme of the correlation being zero, each input is fed to one output position only (generally one of the outputs, but it could be a panned position between two of them).

Thus, there is a continuum between full correlation, with a single signal panned between two outputs in accordance with the relative energies of the inputs, through random-xcor with the inputs distributed uniformly among all outputs, to zero correlation with M inputs fed independently to M output positions.

Interaction Compensation

As mentioned above, channel translation according to an aspect of the present invention may be considered to involve a lattice of "modules". Because multiple modules may share a given input channel, interactions are possible between modules and may degrade performance unless some compensation is applied. Although it is not generally possible to separate signals at an input according to which module they "go with", estimating the amount of an input signal used by each connected module can improve the resulting correlation and direction estimates, resulting in improved overall performance.

As mentioned above, there are two types of module interactions: those that involve modules at a common or lower hierarchy level (i.e., modules with a like number of inputs or fewer inputs), referred to as "neighbors", and modules at a higher hierarchy level (having more inputs)

than a given module but sharing one or more common inputs, referred to as "higher-order neighbors".

Consider first neighbor compensation at a common hierarchy level. To understand the problems caused by neighbor interaction, consider an isolated two-input module with identical L/R (left and right) input signals, A. This corresponds to a single dominant (common) signal halfway between the inputs. The common energy is $A^2$ and the correlation is 1.0. Assume a second two-input module with a common signal, B, at its L/R inputs, a common energy $B^2$, and also a correlation of 1.0. If the two modules are connected at a common input, the signal at that input will be A+B. Assuming signals A and B are independent, then the averaged product of AB will be zero, so the common energy of the first module will be $A(A+B)=A^2+AB=A^2$ and the common energy of the second module will be $B(A+B)=B^2+AB=B^2$. So, the common energy is not affected by neighboring modules, so long as they process independent signals. This is generally a valid assumption. If the signals are not independent, are the same, or at least substantially share common signal components, the system will react in a manner consistent with the response of the human ear—namely, the common input will be larger causing the resulting audio image to pull toward the common input. In that case, the L/R input amplitude ratios of each module are offset because the common input has more signal amplitude (A+B) than either outer input, which causes the direction estimate to be biased toward the common input. In that case, the correlation value of both modules is now something less than 1.0 because the waveforms at both pairs of inputs are different. Because the correlation value determines the degree of spreading of the non-common signal components and the ratio of the dominant (common signal component) to non-dominant (non-common signal component) energy, uncompensated common-input signal causes the non-common signal distribution of each module to be spread.

To compensate, a measure of the "common input level" attributable to each input of each module, is estimated, and then each module is informed regarding the total amount of such common input level energy of all neighboring levels of the same hierarchy level at each module input. Two ways of calculating the measure of common input level attributable to each input of a module are described herein: one which is based on the common energy of the inputs to the module (described generally in the next paragraph), and another, which is more accurate but requires greater computational resources, which is based on the total energy of the interior outputs of the module (described below in connection with the arrangement of FIG. 6A).

According to the first way of calculating the measure of common input level attributable to each input of a module, the analysis of a module's input signals does not allow directly solving for the common input level at each input, only a proportion of the overall common energy, which is the geometric mean of the common input energy levels. Because the common input energy level at each input cannot exceed the total energy level at that input, which is measured and known, the overall common energy is factored into estimated common input levels proportional to the observed input levels, subject to the qualification below. Once the ensemble of common input levels is calculated for all modules in the lattice (whether the measure of common input levels is based on the first or second way of calculation), each module is informed of the total of the common input levels of all the neighboring modules at each input, a quantity referred to as the "neighbor level" of a module at each of its inputs. The module then subtracts the neighbor level from the input level at each of its inputs to derive compensated input levels, which are used to calculate the correlation and the direction (nominal ongoing primary direction of the input signals).

For the example cited above, the neighbor levels are initially zero, so because the common input has more signal than either end input, the first module claims a common input power level at that input in excess of $A^2$ and the second module claims a common input level at the same input in excess of $B^2$. Since the total claims are more than the available energy at that level, the claims are limited to about $A^2$ and $B^2$, respectively. Because there are no other modules connected to the common input, each common input level corresponds to the neighbor level of the other module. Consequently, the compensated input power level seen by the first module is $$(A^2+B^2)-B^2=A^2$$

and the compensated input power level seen by the second module is $$(A^2+B^2)-A^2=B^2.$$

However, these are just the levels that would have been observed with the modules isolated. Consequently, the resulting correlation values will be 1.0, and the dominant directions will be centered, at the proper amplitudes, as desired. Nevertheless, the recovered signals themselves will not be completely isolated—the first module's output will have some B signal component, and vice versa, but this is a limitation of a matrix system, and if the processing is performed on a multiband basis, the mixed signal components will be at a similar frequency, rendering the distinction between them somewhat moot. In more complex situations, the compensation usually will not be as precise, but experience with the system indicates that the compensation in practice mitigates most of the effects of neighbor module interaction.

Having established the principles and signals used in neighbor level compensation, extension to higher-order neighbor level compensation is fairly straightforward. This applies to situations in which two or more modules at different hierarchy levels share more than one input channel in common. For example, there might be a three-input module sharing two inputs with a two-input module. A signal component common to all three inputs will also be common to both inputs of the two-input module, and without compensation, will be rendered at different positions by each module. More generally, there may be a signal component common to all three inputs and a second component common to only the two-input module inputs, requiring that their effects be separated as much as possible for proper rendering of the output soundfield. Consequently, the three-input common signal effects, as embodied in the common input levels described above, should be subtracted from the inputs before the two-input calculation can be performed properly. In fact, the higher-order common signal elements should be subtracted not only from the lower-level module's input levels, but from its observed measure of common energy level as well, before proceeding with the lower level calculation. This is different from the effects of common input levels of modules at the same hierarchy level that do not affect the measure of common energy level of a neighboring module. Thus, the higher-order neighbor levels should be accounted for, and employed, separately from the same-order neighbor levels. At the same time that higher-order neighbor levels are passed down to modules lower in the hierarchy, remaining common levels of lower level modules should also be passed upward in the hierarchy because, as mentioned above, lower level modules act like ordinary neighbors to higher level modules. Some quantities are interdependent and difficult to solve for simultaneously. In order to avoid performing complex simultaneous-solution resource intensive computations, previous calculated values may be passed to the relevant modules. A potential interdependence of module common input levels at different hierarchy levels can be resolved either by using the previous value, as above, or performing calculations in a repetitive sequence (i.e., a loop), from highest hierarchy level to lowest. Alternatively, a simultaneous equation solution may also be possible, although it may involve non-trivial computational overhead.

Although the interaction compensation techniques described only deliver approximately correct values for complex signal distributions, they are believed to provide improvement over a lattice arrangement that fails to take module interactions into consideration.

BRIEF DESCRIPTION OF DRAWINGS

FIG. 2 comprises FIGS. 2A and 2B.

FIG. 2' is a functional block diagram providing an overview of a multiband transform embodiment of a plurality of modules operating with a central supervisor implementing a decoding example of FIG. 1B. FIG. 2' comprises FIGS. 2A' and 2B'.

FIGS. 9A and 9B through FIGS. 16A and 16B are series of idealized representations illustrating the output scale factors of a module resulting from various examples of input signal conditions.

MODES FOR CARRYING OUT THE INVENTION

In order to test aspects of the present invention, an arrangement was deployed having a horizontal array of 5 speakers on each wall of a room having four walls (one speaker in each corner with three spaced evenly between each corner), 16 speakers total, allowing for common corner speakers, plus a ring of 6 speakers above a centrally-located listener at a vertical angle of about 45 degrees, plus a single speaker directly above, total 23 speakers, plus a subwoofer/LFE (low frequency effects) channel, total 24 speakers, all fed from a personal computer set up for 24-channel playback. Although by current parlance, this system might be referred to as a 23.1 channel system, for simplicity it will be referred to as a 24-channel system herein.

Figure 1A:
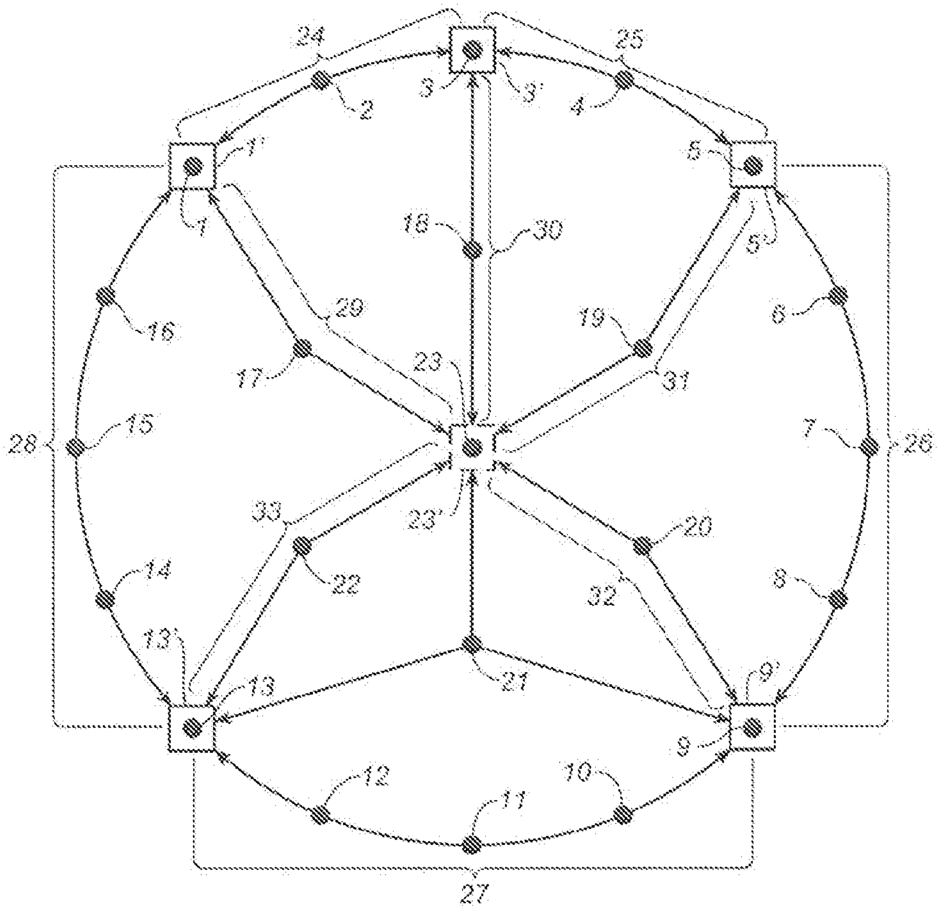
FIG. 1A is a top plan view showing schematically an idealized encoding and/or decoding arrangement in the manner of a test arrangement employing a sixteen channel horizontal array around the walls of a room, a six channel array disposed in a circle above the horizontal array and a single overhead (top) channel.

FIG. 1A is a top plan view showing schematically an idealized decoding arrangement in the manner of the just-described test arrangement. The figure also represents an idealized encoding arrangement in which 23.1 source channels are downmixed to 6.1 channels consisting of 5.1 channels (left, center, right, left surround, right surround and LFE), as is standard in commonly-employed systems, plus one additional channel (a top channel).

Returning to the description of FIG. 1A as a decoding or upmixing arrangement, five wide range horizontal input channels are shown as squares 1', 3', 5', 9' and 13' on the outer circle. A vertical or top channel, which may be derived from the five wide range inputs via correlation or generated reverberation, or separately supplied as a sixth channel (as just mentioned above and as in FIG. 2A/2B), is shown as the broken square 23' in the center. The twenty-three wide range output channels are shown as numbered filled circles 1-23. The outer circle of sixteen output channels is on a horizontal plane, the inner circle of six output channels is forty-five degrees above the horizontal plane. Output channel 23 is directly above one or more listeners. Five two-input decoding modules are delineated by brackets 24-28 around the outer circle, connected between each pair of horizontal input channels. Five additional two-input vertical decoding modules are delineated by brackets 29-33 connecting the vertical channel to each of the horizontal inputs. Output channel 21, the elevated center rear channel, is derived from a three-input decoding module 34 illustrated as arrows between output channel 21 and input channels 9, 13 and 23. Thus, three-input module 34 is one level higher in hierarchy than its two-input lower hierarchy neighbor modules 27, 32 and 33. In this example, each module is associated with a respective pair or trio of closest spatially adjacent input channels. Every module in this example has at least three same-level neighbors. For example, modules 25, 28 and 29 are neighbors of module 24.

Although the decoding modules represented in FIG. 1A have, variously, three, four or five output channels, a decoding module may have any reasonable number of output channels. An output channel may be located intermediate two or more input channels or at the same position as an input channel. Thus, in the FIG. 1A example, each of the input channel locations is also an output channel. Two or three decoding modules share each input channel.

Although the arrangement of FIG. 1A employs five modules (24-28) (each having two inputs) and five inputs (1', 3', 5', 9' and 13') to derive sixteen horizontal outputs (1-16) representing locations around the four walls of a room, similar results may be obtained with a minimum of three inputs and three modules (each having two inputs, each module sharing one input with another module).

By employing multiple modules in which each module has output channels in an arc or a line (such as the example of FIGS. 1A, 1B, 2 and 2'), decoding ambiguities encountered in prior art decoders in which correlations less than zero are decoded as indicating rearward directions may be avoided.

An alternative to the encoding/decoding arrangement of FIG. 1A is described below in connection with the description of FIG. 1B.

Although input and output channels may be characterized by their physical position, or at least their direction, characterizing them with a matrix is useful because it provides a well-defined signal relationship. Each matrix element (row i, column j) is a transfer function relating input channel i to output channel j. Matrix elements are usually signed multiplicative coefficients, but may also include phase or delay terms (in principle, any filter), and may be functions of frequency (in discrete frequency terms, a different matrix at each frequency). This is straightforward in the case of dynamic scale factors applied to the outputs of a fixed matrix, but it also lends itself to variable-matrixing, either by having a separate scale factor for each matrix element, or, for matrix elements more elaborate than simple scalar scale factors, in which matrix elements themselves are variable, e.g., a variable delay.

There is some flexibility in mapping physical positions to matrix elements; in principle, embodiments of aspects of the present invention may handle mapping an input channel to any number of output channels, and vice versa, but the most common situation is to assume signals mapped only to the nearest output channels via simple scalar factors which, to preserve power, sum-square to 1.0. Such mapping is often done via a sine/cosine panning function.

For example, with two input channels and three interior output channels on a line between them plus the two endpoint output channels coincident with the input positions (i.e., an M:N module in which M is 2 and N is 5), one may assume that the span represents 90 degrees of arc (the range that sine or cosine change from 0 to 1 or vice versa), so that each channel is 90 degrees/4 intervals=22.5 degrees apart, giving the channels matrix coefficients of (cos (angle), sin (angle)):

Lout coeffs=cos (0), sin (0)=(1, 0)

MidLout coeffs=cos (22.5), sin (22.5)=(0.92, 0.38)

Cout coeffs=cos (45), sin (45)=(0.71, 0.71)

MidRout coeffs=cos (67.5, sin (67.5)=(0.38, 0.92)

Rout coeffs=cos (90), sin (90)=(0, 1)

Thus, for the case of a matrix with fixed coefficients and a variable gain controlled by a scale factor at each matrix output, the signal output at each of the five output channels is (where "SF" is a scale factor for a particular output identified by the subscript):

Lout=Lt (SFL)

MidLout=((0.92) Lt+(0.38) Rt)) ($SF_{MidL}$)

Cout=((0.45) Lt+(0.45) Rt)) ($SF_C$)

MidRout=((0.38) Lt+(0.92) Lt)) ($SF_{MidR}$)

Rout=Rt ($SF_R$)

Generally, given an array of input channels, one may conceptually join nearest inputs with straight lines, representing potential decoder modules. (They are "potential" because if there is no output channel that needs to be derived from a module, the module is not needed). For typical arrangements, any output channel on a line between two input channels may be derived from a two-input module (if sources and transmission channels are in a common plane, then any one source appears in at most two input channels, in which case there is no advantage in employing more than two inputs). An output channel in the same position as an input channel is an endpoint channel, perhaps of more than one module. An output channel not on a line or at the same position as an input (e.g., inside or outside a triangle formed by three input channels) requires a module having more than two inputs.

Decode modules with more than two inputs are useful when a common signal occupies more than two input channels. This may occur, for example, when the source channels and input channels are not in a plane: a source channel may map to more than two input channels. This occurs in the example of FIG. 1A when mapping 24 channels (16 horizontal ring channels, 6 elevated ring channels, 1 vertical channel, plus LFE) to 6.1 channels (including a composite vertical or top channel). In that case, the center rear channel in the elevated ring is not in a direct line between two of the source channels, it is in the middle of a triangle formed by the Ls (13), Rs (9), and top (23) channels, so a three-input module is required to extract it. One way to map elevated channels to a horizontal array is to map each of them to more than two input channels. That allows the 24 channels of the FIG. 1A example to be mapped to a conventional 5.1 channel array. In that alternative, a plurality of three-input modules may extract the elevated channels, and the leftover signal components may be processed by two-input modules to extract the main horizontal ring of channels. Such alternatives are described further below in connection with FIGS. 1B and 2A'/2B'.

In general, it is not necessary to check for all possible combinations of signal commonality among the input channels. With planar channel arrays (e.g., channels representing horizontally arrayed directions), it is usually adequate to perform pairwise similarity comparison of spatially adjacent channels. For channels arranged in a canopy or the surface of a sphere, signal commonality may extend to three or more channels. Use and detection of signal commonality may also be used to convey additional signal information. For example, a vertical or top signal component may be represented by mapping to all five full range channels of a horizontal five-channel array. Such an alternative is described further below in connection with FIGS. 1B and 2A'/2B'.

Decisions about which input channel combinations to analyze for commonality, along with a default input/output-mapping matrix, need only be done once per input/output channel translator or translator function arrangement, in configuring the translator or translator function. The "initial mapping" (before processing) derives a passive "master" matrix that relates the input/output channel configurations to the spatial orientation of the channels. As one alternative, the processor or processing portion of the invention may generate time-varying scale factors, one per output channel, which modify either the output signal levels of what would otherwise have been a simple, passive matrix or the matrix coefficients themselves. The scale factors in turn derive from a combination of (a) dominant, (b) even-spread (fill), and (c) residue (endpoint) signal components as described below.

Figure 1B:
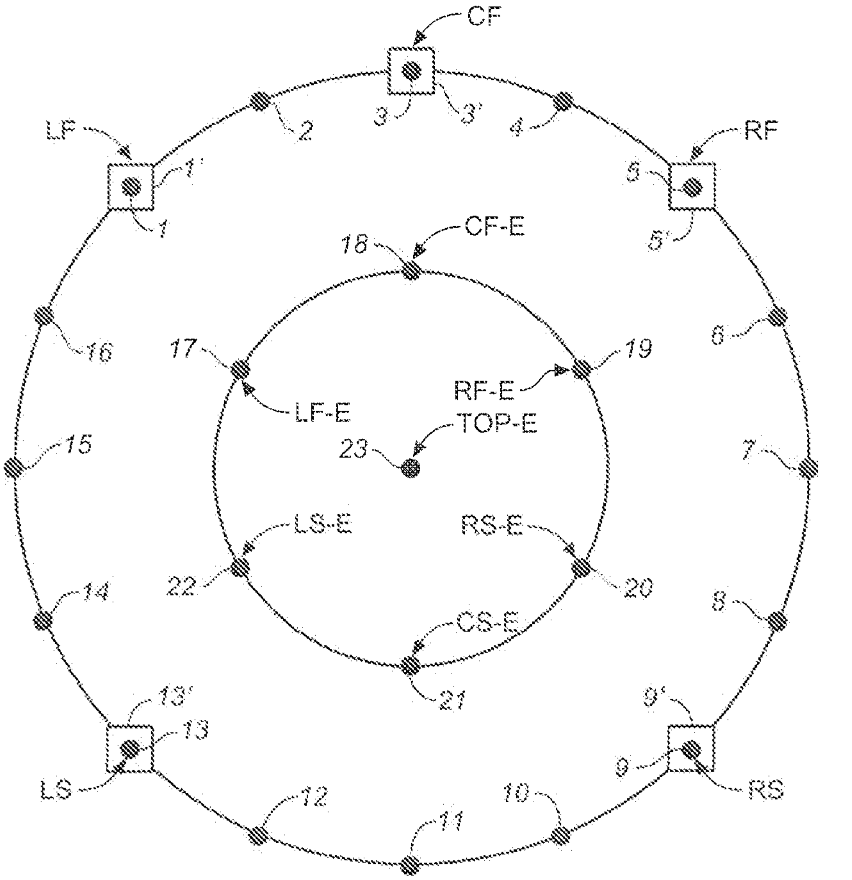
FIG. 1B is a top plan view showing schematically an idealized alternative encoding and/or decoding arrangement employing a sixteen channel horizontal array around the walls of a room, a six channel array disposed in a circle above the horizontal array and a single overhead (top) channel.

A master matrix is useful in configuring an arrangement of modules such as shown in the examples of FIGS. 1A and 1B and described further below in connection with FIGS. 2A/2B and 2A'/2B'. By examining the master matrix, one may deduce, for example, how many decoder modules are needed, how they are connected, how many input and output channels each has and the matrix coefficients relating each modules' inputs and outputs. These coefficients may be taken from the master matrix; only the non-zero values are needed unless an input channel is also an output channel (i.e., an endpoint).

Each module preferably has a "local" matrix, which is that portion of the master matrix applicable to the particular module. In the case of a multiple module arrangement, such as the example of FIGS. 1A and 2A/2B, the module may use the local matrix for the purpose of producing scale factors (or matrix coefficients) for controlling the master matrix, as is described below in connection with FIGS. 2, 2' and 4A-4C, or for the purpose of producing a subset of the output signals, which output signals are assembled by a central process, such as a supervisor as described in connection with FIGS. 2A/2B and 2A'/2B'. Such a supervisor, in the latter case, compensates for multiple versions of the same output signal produced by modules having a common output signal in a manner analogous to the manner in which supervisor 201 of FIGS. 2A/2B and 2A'/2B' determines a final scale factor to replace the preliminary scale factors produced by modules that produce preliminary scale factors for the same output channel.

In the case of multiple modules that produce scale factors rather than output signals, such modules may continually obtain the matrix information relevant to itself from a master matrix via a supervisor rather than have a local matrix. However, less computational overhead is required if the module has its own local matrix. In the case of a single, stand-alone module, the module has a local matrix, which is the only matrix required (in effect, the local matrix is the master matrix), and that local matrix is used to produce output signals.

Unless otherwise indicated, descriptions of embodiments of the invention having multiple modules are with reference to the alternative in which modules produce scale factors.

Any decode module output channel with only one non-zero coefficient in the module's local matrix (that coefficient is 1.0, since the coefficients sum-square to 1.0) is an end-point channel. Output channels with more than one nonzero coefficient are interior output channels. Consider a simple example. If output channels O1 and O2 are both derived from input channels I1 and I2 (but with different coefficient values), then one needs a 2-input module connected between I1 and I2 generating outputs O1 and O2, possibly among others. In a more complex case, if there are 5 inputs and 16 outputs, and one of the decoder modules has inputs I1 and I2 and feeds outputs O1 and O2 such that:

$$O1 = A\ I1 + B\ I2 + 0\ I3 + 0\ I4 + 0\ I5$$

(note no contribution from input channels I3, I4, or I5), and $$O2 = C\ I1 + D\ I2 + 0\ I3 + 0 I4 + 0\ I5$$

(note no contribution from input channels I3, I4, or I5), then the decoder may have two inputs (I1 and I2), two outputs, and the scale factors relating them are:

$$O1 = A\ I1 + B\ I2, \text{ and}$$

$$O2 = C\ I1 + D\ I2.$$

Either the master matrix or the local matrix, in the case of a single, stand-alone module, may have matrix elements that function to provide more than multiplication. For example, as noted above, matrix elements may include a filter function, such as a phase or delay term, and/or a filter that is a function of frequency. One example of filtering that may be applied is a matrix of pure delays that may render phantom projected images. In practice, such a master or local matrix may be divided, for example, into two functions, one that employs coefficients to derive the output channels, and a second that applies a filter function.

Figures 2, 2A:
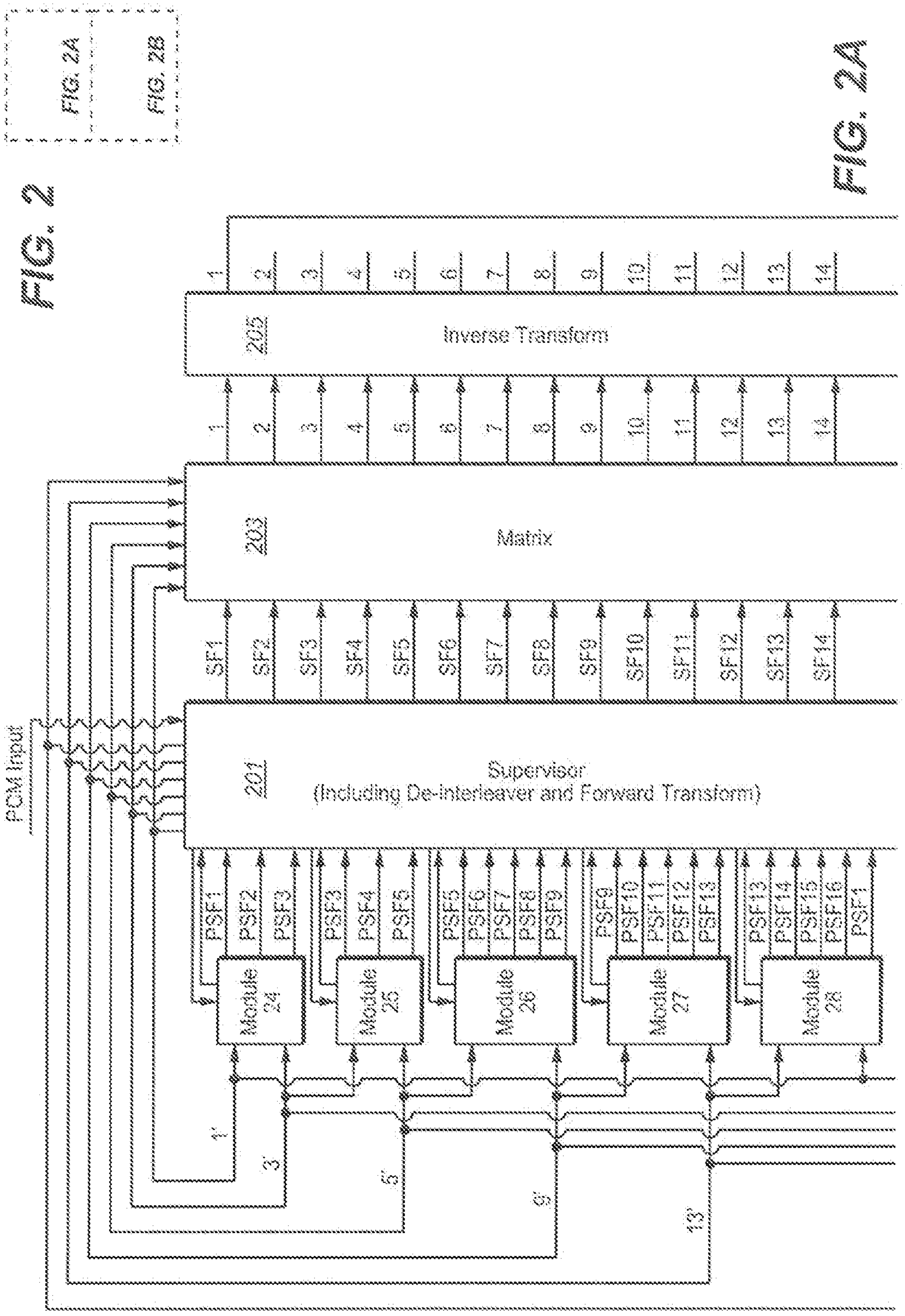
FIG. 2 is a functional block diagram providing an overview of a multiband transform embodiment of a plurality of modules operating with a central supervisor implementing a decoding example of FIG. 1A.
FIG. 2A' and FIG. 2B' are a functional block diagram providing an overview of a multiband transform embodiment of a plurality of modules operating with a central supervisor implementing a decoding example of FIG. 1B.
Figure 2B:
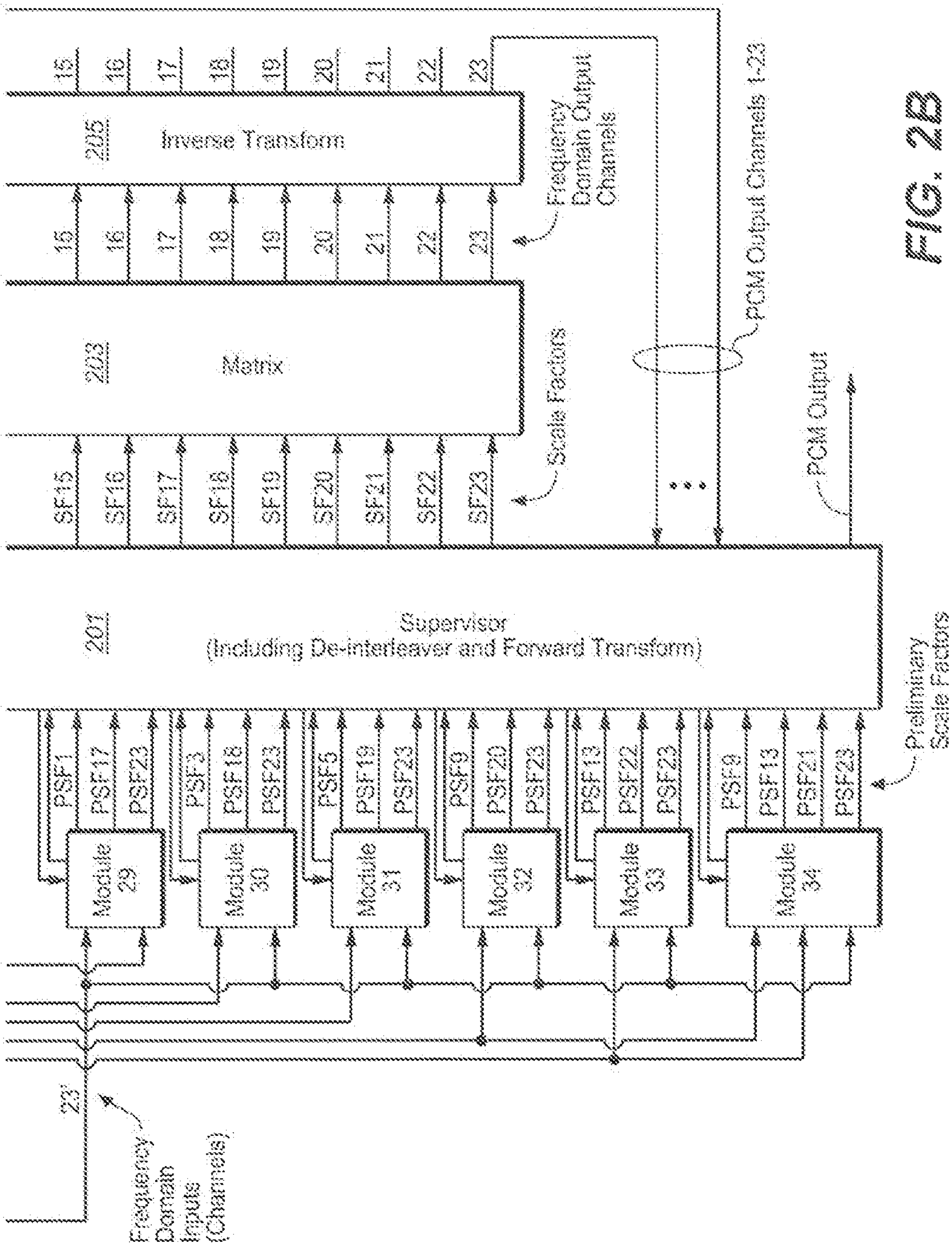
Figures 2, 2A:
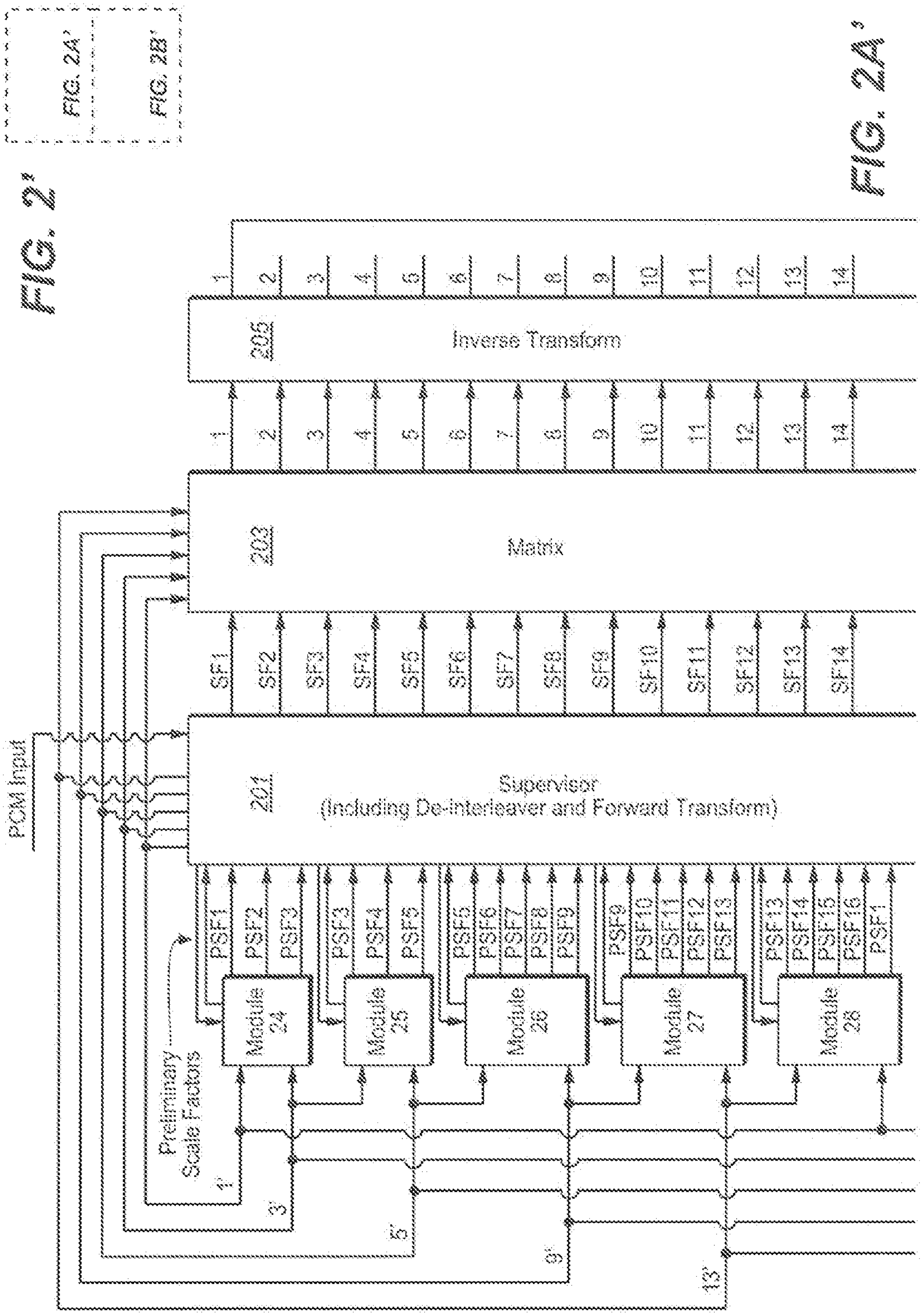
Figure 2B:
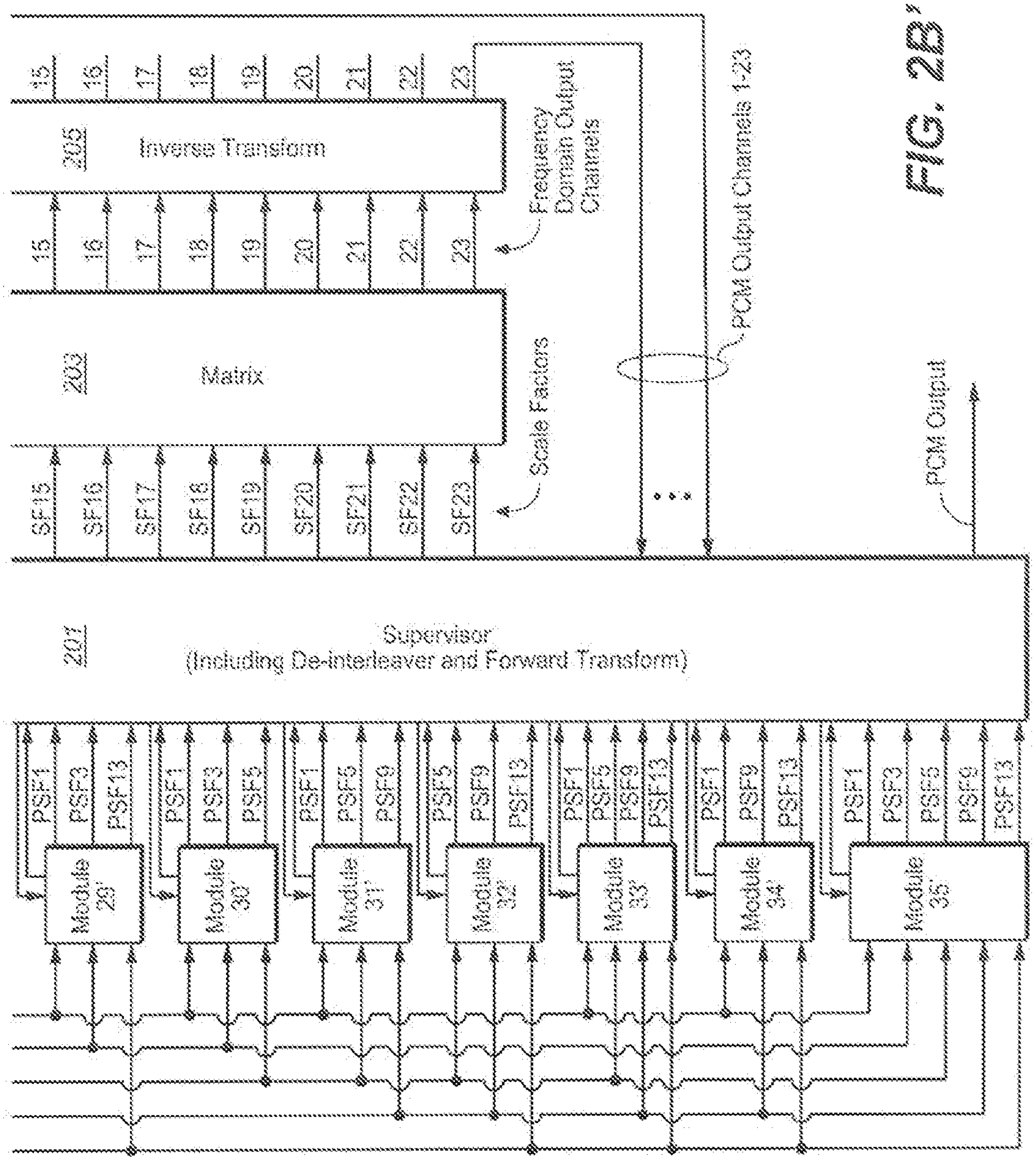

FIGS. 2A/2B are a functional block diagram providing an overview of a multiband transform embodiment implementing the example of FIG. 1A. FIGS. 2A'/2B' is a functional block diagram providing an overview of a multiband transform embodiment implementing the example of FIG. 1B. It differs from FIGS. 2A/2B in that certain ones of the modules of FIG. 2B (namely, modules 29-34) receive a different set of inputs (such modules are designated by numerals 29'-34; FIGS. 2B' also has an additional module, module 35'). Other than the differences in some module inputs, FIGS. 2A/2B and 2A'/2B' are the same and the same reference numerals are used for corresponding elements. In both FIGS. 2A/2B and 2A'/2B', a PCM audio input, for example, having multiple interleaved audio signal channels is applied to a supervisor or supervisory function 201 (hereinafter "supervisor 201") that includes a de-interleaver that recovers separate streams of each of six audio signal channels (I', 3', 5', 9', 13' and 23') carried by the interleaved input and applies each to a time-domain to frequency-domain transform or transform function (hereinafter "forward transform"). Alternatively, the audio channels may be received in separate streams, in which case no de-interleaver is required.

As noted above, signal translation according to the present invention may be applied either to wideband signals or to each frequency band of a multiband processor, which may employ either a filter bank, such as a discrete critical-band filterbank or a filterbank having a band structure compatible with an associated decoder, or a transform configuration, such as an FFT (Fast Fourier Transform) or MDCT (Modified Discrete Cosine Transform) linear filterbank. FIGS. 2A/2B, 2A'/2B', 4A-4C and other figures are described in the context of a multiband transform configuration.

Not shown in FIGS. 1A, 1B, 2A/2B, 2A'/2B' and other figures, for simplicity, is an optional LFE input channel (a potential seventh input channel in FIGS. 1A and 2A/2B and a potential sixth input channel in FIGS. 1B and 2A'/2B') and output channel (a potential 24 th output channel in FIGS. 1A and 2A/2B). The LFE channel may be treated generally in the same manner as the other input and output channels, but with its own scale factor fixed at "1" and its own matrix coefficient, also fixed at "1". In cases where the source channels have no LFE but the output channels do (for example, a 2:5.1 upmix), an LFE channel may be derived by using a lowpass filter (for example, a fifth-order Butterworth filter with a 120 Hz corner frequency) applied to the sum of the channels, or, to avoid cancellation upon addition of the channels, a phase-corrected sum of the channels may be employed. In cases where the input has an LFE channel, but not the output, the LFE channel may be added to one or more of the output channels.

Continuing with the description of FIGS. 2A/2B and 2A'/2B', modules 24-34 (24-28 and 29" through 35' in FIG. 2A'/2B') receive appropriate ones of the six inputs 1', 3', 5', 9', 13' and 23' in the manner shown in FIGS. 1A and 1B. Each module generates a preliminary scale factor ("PSF") output for each of the audio output channels associated with it as shown in FIGS. 1A and 1B. Thus, for example, module 24 receives inputs 1' and 3' and generates preliminary scale factor outputs PSF1, PSF2 and PSF3. Alternatively, as mentioned above, each module may generate a preliminary set of audio outputs for each of the audio output channels associated with it. Each module also may communicate with a supervisor 201, as explained further below. Information sent from the supervisor 201 to various modules may include neighbor level information and higher-order neighbor level information, if any. Information sent to the supervisor from each module may include the total estimated energy of interior the outputs attributable to each of the module's inputs. The modules may be considered part of a control signal-generating portion of the overall system of FIGS. 2 and 2'.

A supervisor, such as supervisor 201 of FIGS. 2A/2B and 2A'/2B', may perform a number of diverse functions. A supervisor may, for example, determine if more than one module is in use, and, if not, the supervisor need not perform any functions relating to neighbor levels. During initialization, the supervisor may inform the or each module the number of inputs and outputs it has, the matrix coefficients relating them, and the sampling rate of the signal. As already mentioned, it may read the blocks of interleaved PCM samples and de-interleave them into separate channels. It may apply unlimiting action in the time domain, for example, in response to additional information indicating that the source signal was amplitude limited and the degree of that limiting. If the system is operating in a multiband mode, it may apply windowing and a filterbank (e.g., FFT, MDCT, etc.) to each channel (so that multiple modules do not perform redundant transforms that substantially increase the processing overhead) and pass streams of transform values to each module for processing. Each module passes back to the supervisor a two-dimensional array of scale factors: one scale factor for all transform bins in each subband of each output channel (when in a multiband transform configuration, otherwise one scale factor per output channel), or, alternatively, a two-dimensional array of output signals: an ensemble of complex transform bins for each subband of each output channel (when in a multiband transform configuration, otherwise one output signal per output channel). The supervisor may smooth the scale factors and apply them to the signal path matrixing (matrix 203, described below) to yield (in a multiband transform configuration) output channel complex spectra. Alternatively, when the module produces output signals, the supervisor may derive the output channels (output channel complex spectra, in a multiband transform configuration), compensating for local matrices that produce the same output signal. It may then perform an inverse transform plus windowing and overlap-add, in the case of MDCT, for each output channel, interleaving the output samples to form a composite multichannel output stream (or, optionally, it may omit interleaving so as to provide multiple output streams), and sends it on to an output file, soundcard, or other final destination.

Although various functions may be performed by a supervisor, as described herein, or by multiple supervisors, one of ordinary skill in the art will appreciate that various ones or all of those functions may be performed in the modules themselves rather than by a supervisor common to all or some of the modules. For example, if there is only a single, stand-alone module, there need be no distinction between module functions and supervisor functions. Although, in the case of multiple modules, a common supervisor may reduce the required overall processing power by eliminating or reducing redundant processing tasks, the elimination of a common supervisor or its simplification may allow modules to be easily added to one another, for example, to upgrade to more output channels.

Returning to the description of FIGS. 2A/2B and 2A'/2B', the six inputs 1', 3', 5', 9', 13' and 23' are also applied to a variable matrix or variable matrixing function 203 (hereinafter "matrix 203"). Matrix 203 may be considered a part of the signal path of the system of FIGS. 2A/2B and 2A'/2B'. Matrix 203 also receives as inputs from supervisor 201 a set of final scale factors SF1 through SF23 for each of the 23 output channels of the FIGS. 1A and 1B examples. The final scale factors may be considered as being the output of the control signal portion of the system of FIGS. 2A/2B and 2A'/2B'. As is explained further below, the supervisor 201 preferably passes on, as final scale factors to the matrix, the preliminary scale factors for every "interior" output channel, but the supervisor determines final scale factors for every endpoint output channel in response to information it receives from modules. An "interior" output channel is intermediate to the two or more "endpoint" output channels of each module. Alternatively, if the modules produce output signals rather than scale factors, no matrix 203 is required; the supervisor itself produces the output signals.

In the FIGS. 1A and 1B examples, it is assumed that the endpoint output channels coincide with the input channel locations, although it is not necessary that they coincide, as is discussed further elsewhere. Thus, output channels 2, 4, 6-8, 10-12, 14-16, 17, 18, 19, 20, 21 and 22 are interior output channels. Interior output channel 21 is intermediate or bracketed by three input channels (input channels 9', 13' and 23'), whereas the other interior channels are each intermediate (between or bracketed by) two input channels. Because there are multiple preliminary scale factors for those endpoint output channels that are shared between or among modules (i.e., output channels 1, 3, 5, 9, 13 and 23), the supervisor 201 determines the final endpoint scale factors (SF1, SF3, etc.) among the scale factors SF1 through SF23. The final interior output scale factors (SF2, SF4, SF6, etc.) are the same as the preliminary scale factors.

A disadvantage of the arrangements of FIGS. 1A and 2A/2B is that a plurality of input source channels are mapped to 6.1 channels (5.1 channels plus a top-elevation channel), rendering such a downmix incompatible with existing 5.1 channel horizontal planar array systems, such as those used in Dolby Digital film soundtracks or on DVD's ("Dolby" and "Dolby Digital" are trademarks of Dolby Laboratories Licensing Corporation).

As mentioned above, one way to map elevated channels to a horizontal planar array is to map each of them to more than two input channels. For example, that allows the 24 original source channels of the FIG. 1B example to be mapped to a conventional 5.1 channel array (see Table A below in which the reference numerals 1 through 23 refer to directions in FIG. 1B). In such an alternative, a plurality of more-than-two-input modules (not shown in FIG. 1B) may extract "varied-distance" in-plane (outside or inside the listening area established by a standard 5.1 channel array) or "out-of-plane" (above the plane-"elevated" channels or below the plane-"lowered") channels, and the leftover signal components may be processed by two-input modules to extract horizontal channels. "Varied-distance" channels may be fed to actual speakers placed in the interior of the room, to provide a variable-distance presentation; and could be projected to the interior or exterior of the listening space as virtual interior or exterior channels. A vertical or top signal component may be represented by mapping, for example, to all five channels of a horizontal five-channel array. Thus, the 5.1 channel downmix can be played with a conventional 5.1 channel decoder, while a decoder in accordance with the examples of FIG. 1B and 2B can recover an approximation to the original 24 channels or some other desired output channel configuration.

Thus, according to the alternative of the examples of FIGS. 1B and 2A'/2B' and as shown in Table A, each standard horizontal source channel is mapped to one or two downmix channels of the 5.1 channel downmix, while other source channels are each mapped to more than two channels of the 5.1 channel downmix. Thus, for a 23.1 channel source arrangement of the FIGS. 1A and 1B examples, the various channels may be mapped as follows:

TABLE A

| Encode/Downmix | | Decode/Upmix | |
|---|---|---|---|
| Source Channel | Downmix Channels | Source Channel(s) | Upmix Channel |
| Lf (1) | Lf | Lf | Lf (1) |
| (2) | Lf + Cf | Lf + Cf | (2) |
| Cf (3) | Cf | Cf | Cf (3) |
| (4) | Cf + Rf | Cf + Rf | (4) |
| Rf (5) | Rf | Rf | Rf (5) |
| (6) | Rf + Rs | Rf + Rs | (6) |
| (7) | Rf + Rs | Rf + Rs | (7) |
| (8) | Rf + Rs | Rf + Rs | (8) |
| Rs (9) | Rs | Rs | Rs (9) |
| (10) | Rs + Ls | Rs + Ls | (10) |
| (11) | Rs + Ls | Rs + Ls | (11) |
| (12) | Rs + Ls | Rs + Ls | (12) |
| Ls (13) | Ls | Ls | Ls (13) |
| (14) | Ls + Lf | Ls + Lf | (14) |
| (15) | Ls + Lf | Ls + Lf | (15) |
| (16) | Ls + Lf | Ls + Lf | (16) |
| Lf-E (17) | Lf + Cf + Ls | Lf + Cf + Ls | Lf-E (17) |
| Cf-E (18) | Lf + Cf + Rf | Lf + Cf + Rf | Cf-E (18) |
| Rf-E (19) | Cf + Rf + Rs | Cf + Rf + Rs | Rf-E (19) |
| Rs-E (20) | Rf + Rs + Ls | Rf + Rs + Ls | Rs-E (20) |
| Cs-E (21) | Lf + Rf + Ls + Rs | Lf + Rf + Ls + Rs | Cs-E (21) |
| Ls-E (22) | Rs + Ls + Lf | Rs + Ls + Lf | Ls-E (22) |
| Top-E (23) | Lf + Cf + Rf + Ls + Rs | Lf + Cf + Rf + Ls + Rs | Top-E (23) |

In Table A, Lf is left front, Cf is center front, Rf is right front, Ls is left surround, Rs is right surround, Lf-E is left front-elevated, Cf-E is center front-elevated, Rf-E is right front-elevated, Rs-E is right surround-elevated, Cs-e is center surround-elevated, Ls-E is left surround-elevated, and Top-E is top-elevated. The weighting factors (matrix coefficients) may all be equal within each group, or they may be chosen individually. For example, each source channel mapped to three output channels may be mapped to the middle listed channel with twice as much power as the outer-listed two channels; e.g. Lf-Elevated may be mapped to Lf and Ls with matrix coefficients of 0.5 (power 0.25) and to Cf with coefficient of 0.7071 (power 0.5). Mapping to four or five output channels may be performed with all equal matrix coefficients. Following common matrixing practice, the set of matrix coefficients for each source channel may be chosen so as to sum-square to 1.0.

Alternative, more elaborate downmixing arrangements, including dynamic power-preserving downmixing based on source channel cross-correlation, may be provided and are within the scope of the present invention.

It will be noted that in the example of FIG. 1A, the downmixing of 23.1 to 6.1 channels involved mapping all but one of the source channels to only two downmix channels. In that arrangement, only the Cs-Elevated channel mapped to three downmix channels (Ls+Rs+Top).

In order to extract channels that have been mapped to multiple downmix channels, it is necessary to identify the amount of common signal elements in two or more downmix channels. A common technique for doing this (even in application outside of upmixing) is cross correlation. As mentioned above, the measure of cross-correlation preferably is a measure of the zero-time-offset cross-correlation, which is the ratio of the common power level with respect to the geometric mean of the input signal power levels. The common power level preferably is the smoothed or averaged common power level and the input signal power levels are the smoothed or averaged input signal power levels. In this context, the cross-correlation of two signals, S1 and S2, may be expressed as:

$$Xcor=|S1*S2|/Sqrt(|S1*S1|*|S2*S2|),$$

where the vertical bars indicate an average or smoothed value. Correlation of three or more signals is more complicated, although a technique for calculating the cross correlation of three signals is described herein under the heading "Higher Order Calculation of Common Power." For downmixing to 5.1 channels, it is shown in Table A that source channels may map to as many as five downmix channels, necessitating the derivation of cross correlation values from a like number of channels, i.e., up to 5th order cross correlation.

Rather than trying to perform an exact solution, which would be computationally intensive, an approximate cross-correlation technique, according to an aspect of the present invention, uses only second-order cross-correlations as described in the above Xcor equation.

The approximate cross-correlation technique involves computing the common power (defined as the numerator of the above Xcor equation) for each pair of nodes involved. For a $3^{rd}$ order correlation of signals S1, S2, and S3, this would be |S1*S2|, |S2*S3|, and |S1*S3|. For a $4^{th}$ order correlation, the common power terms would be |S1*S2|, |S1*S2|,|S1* S3|, |S1*S4|, |S2*S3|, |S2*S4|, and |S3*S4|. The situation for $5^{th}$ order is similar, with a total of ten such terms required. Many of these cross power calculations (five, in fact, for upmixing from 5.1) are already needed for decoding the horizontal channels, so for correlations up to fifth order, a total of ten smoothed cross products are needed, five of which are already calculated and five more are needed for the 5 th order calculation. This total of 10 pairwise calculations also serves for all the $4^{th}$ order correlations as well.

If any of the pairwise cross power values are zero, it means there is no common signal between the two nodes in question, hence there is no signal common to all N (N=3, 4, or 5) nodes, hence there is zero output from the output channel in question. Otherwise, if none are zero, the amount of the common signal indicated by the cross power value of two nodes, Node(i) and Node(j), can be calculated by assuming that the observed cross power obtains from the signal common to all nodes under consideration. If the source channel amplitude is A, then the amplitude at nodes Node(i) and Node(j) is given by the corresponding downmix matrix coefficients, $M_i$, and as $AM_i$, and $AM_j$. Therefore the common power between those nodes, $X=|Si*Sj|=|AM_i*AM_j|$. Therefore, the estimate of the desired output amplitude from the cross power of a pair of nodes i and j is:

$$A(\text{estimated})=Sqrt\ (X/M_i*M_j).$$

From considering the estimated value of A for all pairs of nodes associated with a given output channel, the true value of A can be no greater than the minimum estimate. If the node pair corresponding to the minimum estimate is common to no other outputs, then the minimum estimate is taken as the value of A.

If there are other output channels being mapped to the two nodes in question, then there is not enough information (within this technique) to differentiate between them, so an equal signal distribution between the output channels in question is assumed and all other output channels are mapped to the two nodes in question.

To aid this operation, one may calculate during program initialization a matrix that may be referred to as the "Transfer Matrix," a square matrix relating input node i to input node j, derived from the original encoding (downmix) matrix, wherein the value of the Transfer Matrix at row i column j=the sum of all encoding matrix cross products having a common output channel. For example, suppose that encode source channel 1 maps to downmix channels 1 and 2 with matrix values (0.7071, 0.7071), and suppose that source channel 17 maps to downmix channels 1, 2, and 3 with matrix values 0.577 each (note: 0.577*.577=0.3333, so the matrix values sum squared to 1.0 as desired.) Then the Transfer Matrix at element 1,2 is (0.7071*0.7071+0.577*0.577)=0.5+0.33=0.83. Thus, each element of the Transfer Matrix is a measure of the total output power derived from that pair of nodes. If in deriving the output level of channel 17, one finds a minimum cross power estimate of $A^2$ involving downmix nodes 1 and 2, then the amount of A one may assign to output channel 17 is:

$$\text{Outpower}=A^2*(0.577*0.577)/0.83=0.4A^2.$$

From the ratio of the estimated output amplitude and the amplitudes at the input nodes, we get the final scale factor for the output channel in question.

As explained elsewhere in this document, one may perform the derivation of output levels in a hierarchical order, starting with the output channel derived from the largest number of channels (five in the FIG. 1B example), then the output channels derived from four channels, etc.

After calculating the output level of a given node, the power contribution of each encoded channel to the output is subtracted from the measured power levels associated with the given node before continuing to the next node output calculation.

A disadvantage of the cross-correlation approximation technique is that more signal may be fed to an output channel than was originally present. However, the audible consequences of an error in feeding more signal to an output channel derived from three or more encoded inputs are minor, as the contributing channels are proximate to the output channel and the human ear will have trouble differentiating the extra signal to the derived output channel, given that the local array of output channels will have the correct total power. If the encoded 5.1-channel program is played without decoding, the channels that have been mapped to three or more of the 5.1 channels will be reproduced from the corresponding 5.1 channel speaker array, and heard as somewhat broadened sources by listeners, which should not be objectionable.

Blind Upmixing

The decoding process just described can optionally be fed from any existing 5.1-channel source, even one not specifically encoded as just described. One may refer to such decoding as "blind upmixing". It is desired that such an arrangement produce interesting, esthetically pleasing results, and that it make reasonable use of the derived output channels. Unfortunately, it is not uncommon to find that commercial 5.1-channel motion picture soundtracks have few common signal elements between pairs of channels, and even fewer among combinations of three or more channels. In such a case, an upmixer as just described produces little output for any derived output channel, which is undesirable. In this case, one may provide a blind upmix mode in which the input channel signals are modified or augmented so that at least some signal output is provided in a derived output channels when at least one of the input channels from which the output channel is derived has a signal input.

According to aspects of the present invention, non-augmented decoding looks for (a) correlation among all the input channels from which the output channel is derived, and (b) significant signal levels at each of the input channels from which the output channel is derived.

If there is low pair-wise correlation among any of the involved input channels, or low signal level at any of the involved input channels, then the derived channel gets little or no signal. Each contributing input channel, in effect, has veto power over whether the derived channel gets signal.

In order to perform a blind upmix of channels that have not been encoded in a manner as described herein, one may derive channels in a manner so as to have some signal when, under certain signal conditions, the derived signal would be zero. This may be achieved, for example, by modifying both of the above conditions. As to the first condition, this may be accomplished by setting a lower limit on the value of the correlation. For example, the limit may be a minimum based on the "random equal-distribution" correlation value described elsewhere herein. Then, to satisfy condition (b), one may simply take a weighted average of the signal power of the input channels from which the output channel is derived, wherein the weighting may be the matrix coefficient of the input channel. Employment of such an averaging technique is not critical. Other ways to assure that a derived channel has some signal when at least one of the input channels from which it is derived has some signal may be employed.

Figure 3:
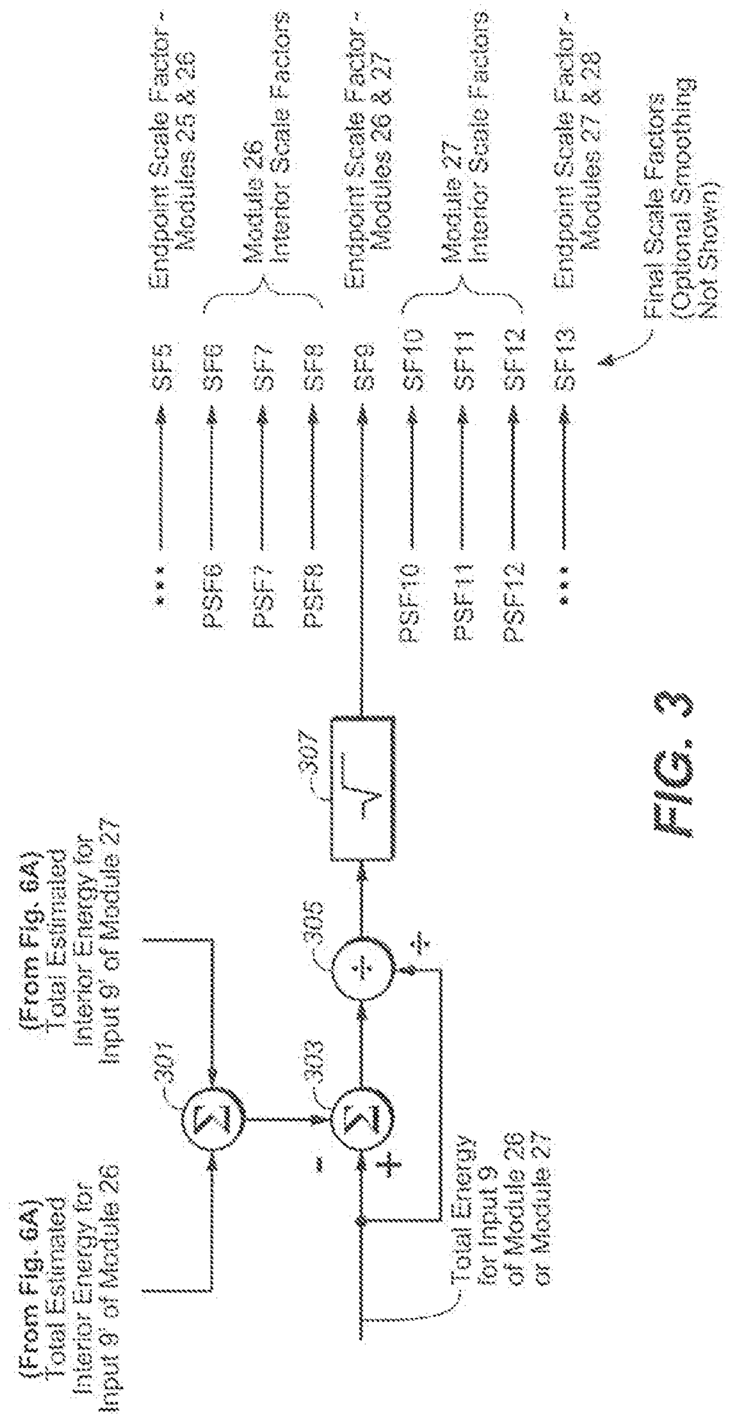
FIG. 3 is a functional block diagram useful in understanding the manner in which a supervisor, such as supervisor 201 of FIGS. 2A/2B and 2A'B' or FIG. 2A'/2B', may determine an endpoint scale factor.

FIG. 3 is a functional block diagram useful in understanding the manner in which a supervisor, such as supervisor 201 of FIGS. 2A/2B and 2A'/2B', may determine an endpoint scale factor. The supervisor does not sum all the outputs of the modules sharing an input to get an endpoint scale factor. Instead, it additively combines, such as in a combiner 301, the total estimated interior energy for a input from each module that shares the input, such as input 9', which is shared by modules 26 and 27 of FIGS. 2A/2B and 2A'/2B'. This sum represents the total energy level at the input claimed by the interior outputs of all the connected modules. It then subtracts that sum from the smoothed input energy level at that input (e.g., the output of smoother 325 or 327 of FIG. 4B, as described below) of any one of the modules that share the input (module 26 or module 27, in this example), such as in combiner 303. It is sufficient to choose any one of the modules' smoothed inputs at the common input even though the levels may differ slightly from module to module because the modules each adjust their time constants independently of each other. The difference, at the output of combiner 303, is the desired output signal energy level at that input, which energy level is not allowed to go below zero. By dividing that desired output signal level by the smoothed input level at that input, as in divider 305, and performing a square root operation, as in block 307, the final scale factor (SF9, in this example) for that output is obtained. Note that the supervisor derives a single final scale factor for each such shared input regardless of how many modules share the input. An arrangement for determining the total estimated energy of the interior outputs attributable to each of the module's inputs is described below in connection with FIG. 6A.

Because the levels are energy levels (a second-order quantity), as opposed to amplitudes (a first-order quantity), after the divide operation, a square-root operation is applied in order to obtain the final scale factor (scale factors are associated with first-order quantities). The addition of the interior levels and subtraction from the total input level are all performed in a pure energy sense, because interior outputs of different module interiors are assumed to be independent (uncorrelated). If this assumption is not true in an unusual situation, the calculation may yield more leftover signal at the input than there should be, which may cause a slight spatial distortion in the reproduced soundfield (e.g., a slight pulling of other nearby interior images toward the input), but in the same situation, the human ear likely reacts similarly. The interior output channel scale factors, such as PSF6 through PSF8 of module 26, are passed on by the supervisor as final scale factors (they are not modified). For simplicity, FIG. 3 only shows the generation of one of the endpoint final scale factors. Other endpoint final scale factors may be derived in a similar manner.

Returning to the description of FIGS. 2A/2B and 2A'/2B', as mentioned above, in the variable matrix 203, the variability may be complicated (all coefficients variable) or simple (coefficients varying in groups, such as being applied to the inputs or the outputs of a fixed matrix). Although either approach may be employed to produce substantially the same results, one of the simpler approaches, that is, a fixed matrix followed by a variable gain for each output (the gain of each output controlled by scale factors) has been found to produce satisfactory results and is employed in the embodiments described herein. Although a variable matrix in which each matrix coefficient is variable is usable, it has the disadvantage of having more variables and requiring more processing power.

Supervisor 201 also performs an optional time domain smoothing of the final scale factors before they are applied to the variable matrix 203. In a variable matrix system, output channels are never "turned off", the coefficients are arranged to reinforce some signals and cancel others. However, a fixed-matrix, variable-gain system, as in described embodiments of the present invention, however, does turn channels on and off, and is more susceptible to undesirable "chattering" artifacts. This may occur despite the two-stage smoothing described below (e.g., smoothers 319/325, etc.). For example, when a scale factor is close to zero, because only a small change is needed to go from 'small' to 'none' and back, transitions to and from zero may cause audible chattering.

The optional smoothing performed by supervisor 201 preferably smooths the output scale factors with variable time constants that depend on the size of the absolute difference ("abs-diff") between newly derived instantaneous scale factor values and a running value of the smoothed scale factor. For example, if the abs-diff is greater than 0.4 (and, of course, <=1.0), there is little or no smoothing applied; a small additional amount of smoothing is applied to abs-diff values between 0.2 and 0.4; and below values of 0.2, the time constant is a continuous inverse function of the abs-diff. Although these values are not critical, they have been found to reduce audible chattering artifacts. Optionally, in a multiband version of a module, the scale factor smoother time constants may also scale with frequency as well as time, in the manner of frequency smoothers 413, 415 and 417 of FIG. 4A, described below.

As stated above, the variable matrix 203 preferably is a fixed decode matrix with variable scale factors (gains) at the matrix outputs. Each matrix output channel may have (fixed) matrix coefficients that would have been the encode downmix coefficients for that channel had there been an encoder with discrete inputs (instead of mixing source channels directly to the downmixed array, which avoids the need for a discrete encoder.) The coefficients preferably sum-square to 1.0 for each output channel. The matrix coefficients are fixed once it is known where the output channels are (as discussed above with regard to the "master" matrix); whereas the scale factors, controlling the output gain of each channel, are dynamic.

Inputs comprising frequency domain transform bins applied to the modules 24-34 of FIGS. 2 (24-28 and 29'-35' of FIG. 2A'/2B') may be grouped into frequency subbands by each module after initial quantities of energy and common energy are calculated at the bin level, as is explained further below. Thus, there is a preliminary scale factor (PSF in FIGS. 2A/2B and 2A'/2B') and a final scale factor (SF in FIGS. 2A/2B and 2A'/2B') for every frequency subband. The frequency-domain output channels 1-23 produced by matrix 203 each comprise a set of transform bins (subband-sized groups of transform bins are treated by the same scale factor). The sets of frequency-domain transform bins are converted to a set of PCM output channels 1-23, respectively, by a frequency-to time-domain transform or transform function 205 (hereinafter "inverse transform"), which may be a function of the supervisor 201, but is shown separately for clarity. The supervisor 201 may interleave the resulting PCM channels 1-23 to provide a single interleaved PCM output stream or leave the PCM output channels as separate streams.

Figure 4A:
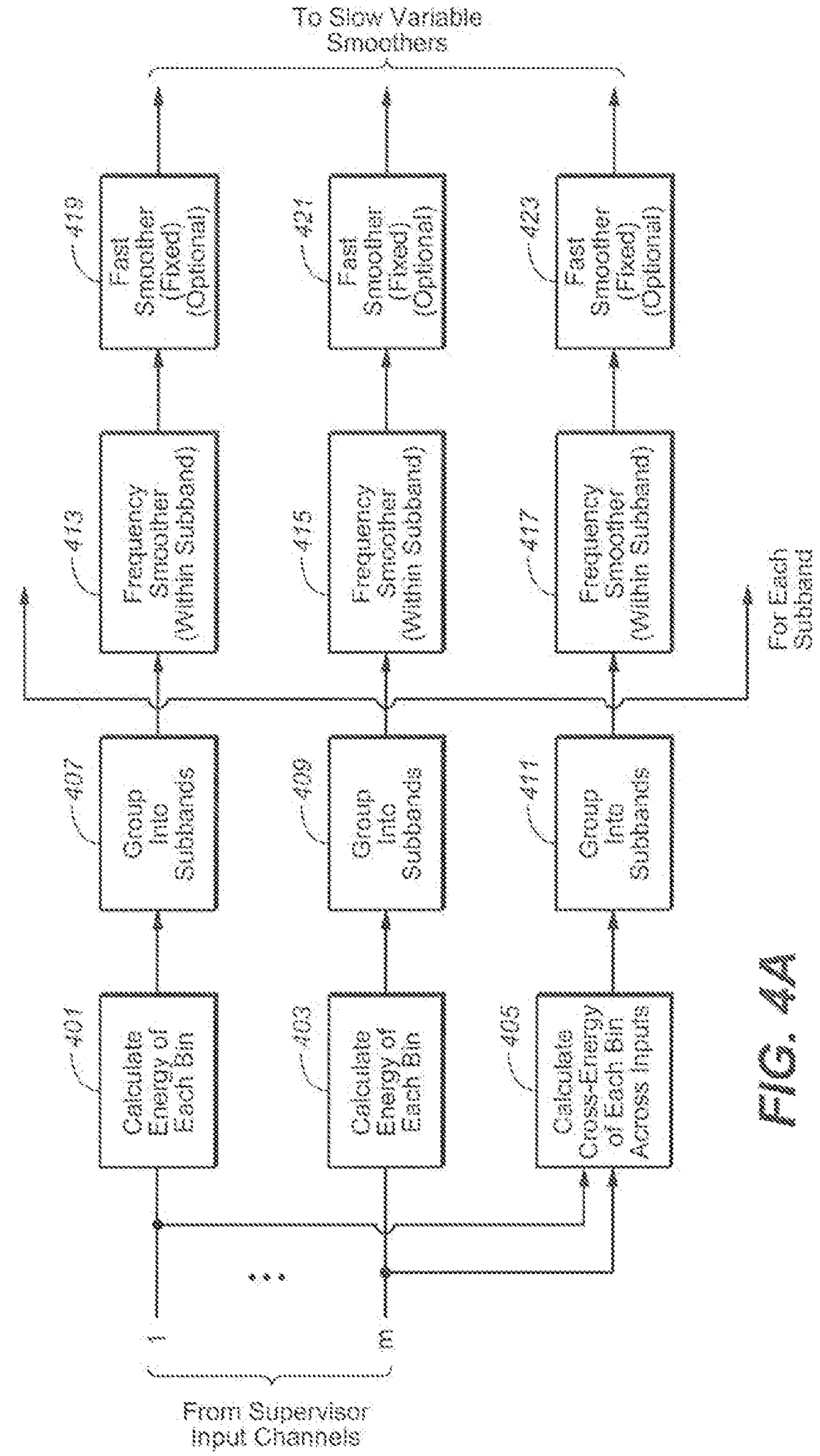
FIGS. 4A-4C show a functional block diagram of a module according to an aspect of the present invention.
Figure 4B:
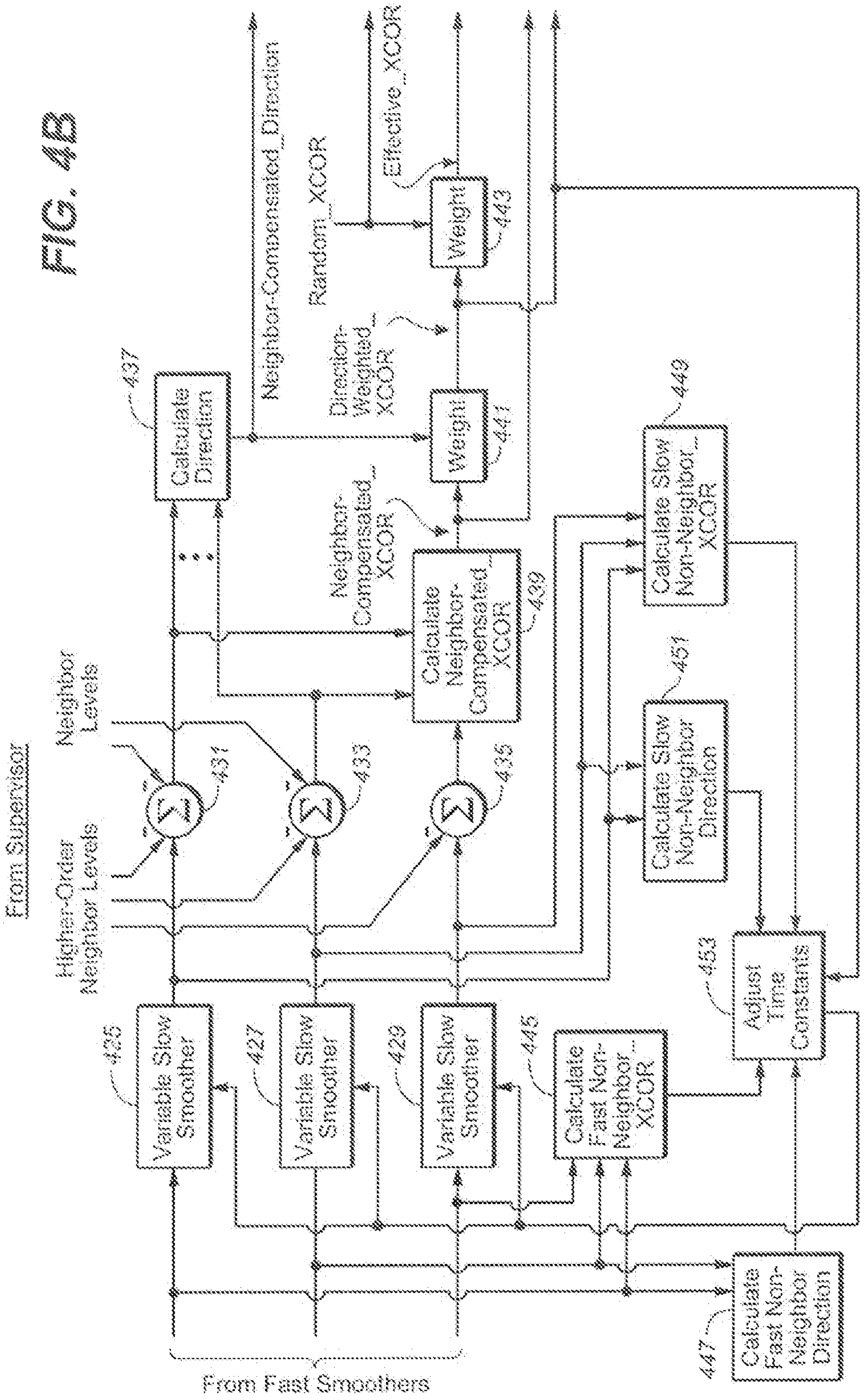
Figure 4C:
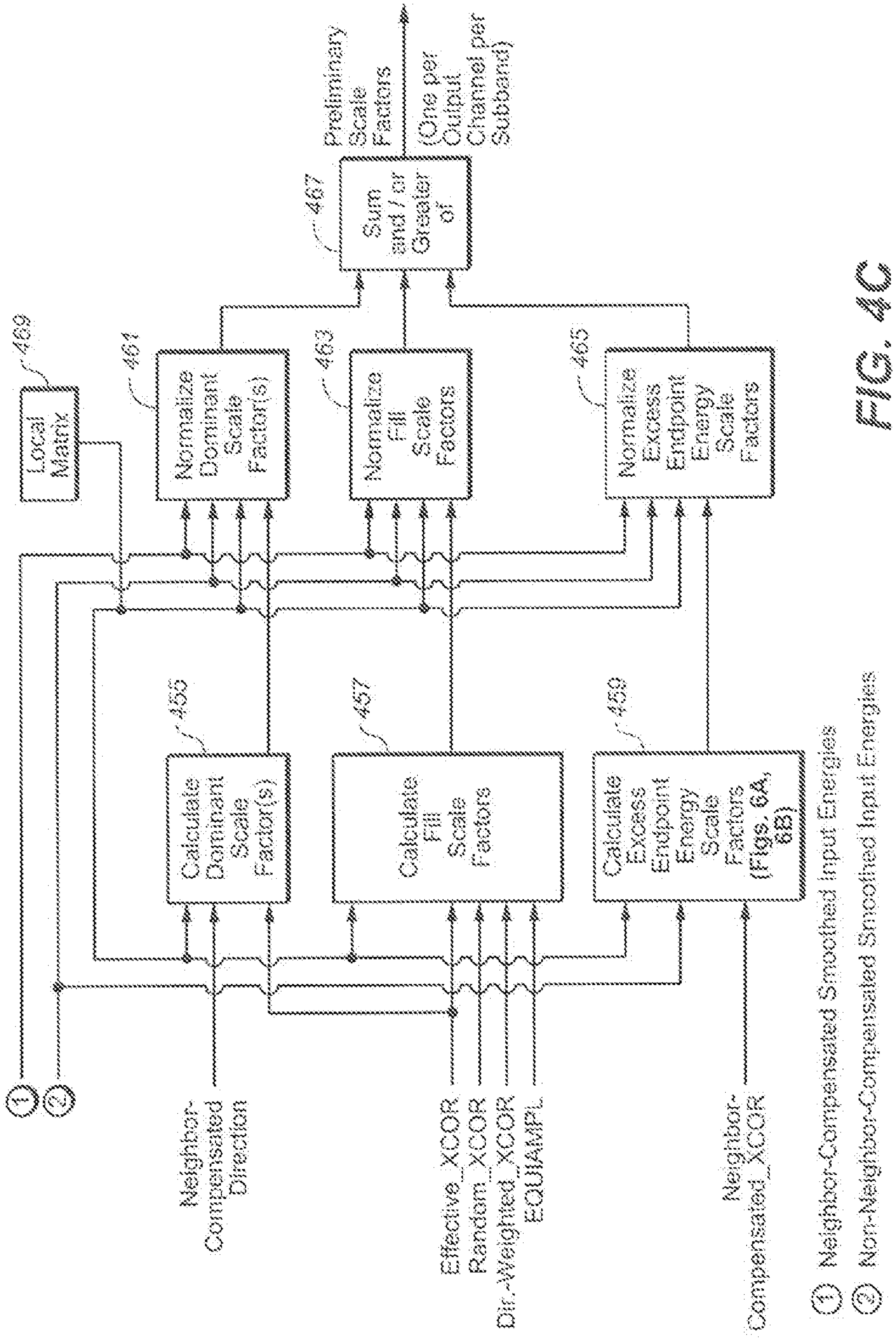

FIGS. 4A-4C show a functional block diagram of a module according an aspect of to the present invention. The module receives two or more input signal streams from a supervisor, such as the supervisor 201 of FIGS. 2A/2B and 2A'/B'. Each input comprises an ensemble of complex-valued frequency-domain transform bins. Each input, 1 through m, is applied to a function or device (such as function or device 401 for input 1 and function or device 403 for input m) that calculates the energy of each bin, which is the sum of the squares of the real and imaginary values of each transform bin (only the paths for two inputs, 1 and m, are shown to simplify the drawing). Each of the inputs is also applied to a function or device 405 that calculates the common energy of each bin across the module's input channels. In the case of an FFT embodiment, this may be calculated by taking the cross product of the input samples (in the case of two inputs, L and R, for example, the real part of the complex product of the complex L bin value and the complex conjugate of the complex R bin value). Embodiments using real values need only cross-multiply the real value for each input. For more than two inputs, the special cross-multiplication technique described below may be employed, namely, if all the signs are the same, the product is given a positive sign, else it is given a negative sign and scaled by the ratio of the number of possible positive results (always two: they are either all positive or all negative) to the number of possible negative results.

Pairwise Calculation of Common Energy

For example, suppose an input channel pair A/B contains a common signal X along with individual, uncorrelated signals Y and Z:

$A=0.707X+Y$ $B=0.707X+Z$ where the scalefactors of $0.707=\sqrt{0.5}$ provide a power preserving mapping to the nearest input channels.

$$\begin{aligned} RMSEnergy(A) &= \int A^2 \partial t = \overline{A^2} \\ &= \overline{(.707X+Y)^2} = \overline{(0.5X^2+0.707XY+Y^2)} \\ &= 0.5\overline{X^2}+0.707\overline{XY}+\overline{Y^2} \end{aligned}$$

Because X and Y are uncorrelated, $\overline{XY}=0$

So:

$\overline{A^2}=0.5\overline{X^2}+\overline{Y^2}$ i.e., Because X and Y are uncorrelated, the total energy in input channel A is the sum of the energies of signals X and Y.

Similarly:

$\overline{B^2}=0.5\overline{X^2}+\overline{Z^2}$

Since X, Y, and Z are uncorrelated, the averaged cross-product of A and B is:

$\overline{AB}=0.5\overline{X^2}$

So, in the case of an output signal shared equally by two neighboring input channels that may also contain independent, uncorrelated signals, the averaged cross-product of the signals is equal to the energy of the common signal component in each channel. If the common signal is not shared equally, i.e., it is panned toward one of the inputs, the averaged cross-product will be the geometric mean between the energy of the common components in A and B, from which individual channel common energy estimates can be derived by normalizing by the square root of the ratio of the channel amplitudes. Actual time averages are computed subsequent smoothing stages, as described below.

Higher Order Calculation of Common Energy

A technique for approximating the common energy of decoding modules with three or more inputs is provided above. Provided here is another way to derive the common energy of decoding modules with three or more inputs. This may be accomplished by forming the averaged cross products of all the input signals. Simply performing pairwise processing of the inputs fails to differentiate between separate output signals between each pair of inputs and a signal common to all.

Consider, for example, three input channels, A, B, and C, made up of uncorrelated signals W, Y, Z, and common signal X:

$A=X+W$ $B=X+Y$ $C=X+Z$

If the average cross-product is calculated, all terms involving combinations of W, Y, and Z cancel, as in the second order calculation, leaving the average of $X^3$:

$\overline{ABC}=\overline{X^3}$

Unfortunately, if X is a zero mean time signal, as expected, then the average of its cube is zero. Unlike averaging $X^2$, which is positive for any nonzero value of X, $X^3$ has the same sign as X, so the positive and negative contributions will tend to cancel. Obviously, the same holds for any odd power of X, corresponding to an odd number of module inputs, but even exponents greater than two can also lead to erroneous results; for example, four inputs with components (X, X, −X, −X) will have the same product/average as (X, X, X, X).

This problem may be resolved by employing a variant of the averaged product technique. Before being averaged, the sign of the each product is discarded by taking the absolute value of the product. The signs of each term of the product are examined. If they are all the same, the absolute value of the product is applied to the averager. If any of the signs are different from the others, the negative of the absolute value of the product is averaged. Since the number of possible same-sign combinations may not be the same as the number of possible different-sign combinations, a weighting factor comprised of the ratio of the number of same to different sign combinations is applied to the negated absolute value products to compensate. For example, a three-input module has two ways for the signs to be the same, out of eight possibilities, leaving six possible ways for the signs to be different, resulting in a scale factor of $2/6=1/3$. This compensation causes the integrated or summed product to grow in a positive direction if and only if there is a signal component common to all inputs of a decoding module.

However, in order for the averages of different order modules to be comparable, they must all have the same dimensions. A conventional second-order correlation involves averages of two-input multiplications and hence of quantities with the dimensions of energy or power. Thus, the terms to be averaged in higher order correlations must be modified also to have the dimensions of power. For a kth order correlation, the individual product absolute values must therefore be raised to the power 2/k before being averaged.

Of course, regardless of the order, the individual input energies of a module, if needed, can be calculated as the average of the square of the corresponding input signal, and need not be first raised to the kth power and then reduced to a second order quantity.

Returning to the description of FIG. 4A, the transform bin outputs of each of the blocks may be grouped into subbands by a respective function or device 407, 409 and 411. The subbands may approximate the human ear's critical bands, for example. The remainder of the module embodiment of FIGS. 4A-4C operates separately and independently on each subband. In order to simplify the drawing, only the operation on one subband is shown.

Each subband from blocks 407, 409 and 411 is applied to a frequency smoother or frequency smoothing function 413, 415, and 417 (hereinafter "frequency smoother"), respectively. The purpose of the frequency smoothers is explained below. Each frequency-smoothed subband from a frequency smoother is applied to optional "fast" smoothers or smoothing functions 419, 421 and 423 (hereinafter "fast smoothers"), respectively, that provide time-domain smoothing. Although preferred, the fast smoothers may be omitted when the time constant of the fast smoothers is close to the block length time of the forward transform that generated the input bins (for example, a forward transform in supervisor 201 of FIGS. 2A/2B and 2A'/2B'). The fast smoothers are "fast" relative to the "slow" variable time constant smoothers or smoother functions 425, 427 and 429 (hereinafter "slow smoothers") that receive the respective outputs of the fast smoothers. Examples of fast and slow smoother time constant values are given below.

Thus, whether fast smoothing is provided by the inherent operation of a forward transform or by a fast smoother, a two-stage smoothing action is preferred in which the second, slower, stage is variable. However, a single stage of smoothing may provide acceptable results.

The time constants of the slow smoothers preferably are in synchronism with each other within a module. This may be accomplished, for example, by applying the same control information to each slow smoother and by configuring each slow smoother to respond in the same way to applied control information. The derivation of the information for controlling the slow smoothers is described below.

Preferably, each pair of smoothers are in series, in the manner of the pairs 419/425, 421/427 and 423/429 as shown in FIGS. 4A and 4B, in which a fast smoother feeds a slow smoother. A series arrangement has the advantage that the second stage is resistant to short rapid signal spikes at the input of the pair. However, similar results may be obtained by configuring the pairs of smoothers in parallel. For example, in a parallel arrangement the resistance of the second stage in a series arrangement to short rapid signal spikes may be handled in the logic of a time constant controller.

Each stage of the two-stage smoothers may be implemented by a single-pole lowpass filter (a "leaky integrator") such as an RC lowpass filter (in an analog embodiment) or, equivalently, a first-order lowpass filter (in a digital embodiment). For example, in a digital embodiment, the first-order filters may each be realized as a "biquad" filter, a general second-order IIR filter, in which some of the coefficients are set to zero so that the filter functions as a first-order filter. Alternatively, the two smoothers may be combined into a single second-order biquad stage, although it is simpler to calculate coefficient values for the second (variable) stage if it is separate from the first (fixed) stage.

It should be noted that in the embodiment of FIGS. 4A, 4B and 4C, all signal levels are expressed as energy (squared) levels, unless an amplitude is required by taking a square root. Smoothing is applied to the energy levels of applied signals, making the smoothers RMS sensing, instead of average sensing, (average sensing smoothers are fed by linear amplitudes). Because the signals applied to the smoothers are squared-levels, the smoothers react to sudden increases in signal level more quickly than average-smoothers, since increases are magnified by the squaring function.

The two-stage smoothers thus provide a time average for each subband of each input channel's energy (that of the 1st channel is provided by slow smoother 425 and that of the mth channel by slow smoother 427) and the average for each subband of the input channels' common energy (provided by slow smoother 429).

The average energy outputs of the slow smoothers (425, 427, 429) are applied to combiners 431, 433 and 435, respectively, in which (1) the neighbor energy levels (if any) (from supervisor 201 of FIGS. 2A/2B and 2A'/B', for example) are subtracted from the smoothed energy level of each of the input channels, and (2) the higher-order neighbor energy levels (if any) (from supervisor 201 of FIGS. 2A/B and 2A'/2B', for example) are subtracted from each of the slow smoother's average energy outputs. For example, each module receiving input 3' (FIGS. 1A, 2A/B and 2A'/B') has two neighboring modules and receives neighbor energy level information that compensates for the effect of those two neighboring modules. However, neither of those modules is a "higher-order" module (i.e., all modules sharing input channel 3' are two-input modules). In contrast, module 28 (FIGS. 1A, 2A/2B and 2A'/2B') is an example of a module that has a higher-order module sharing one of its inputs. Thus, for example, in module 28, the average energy output from a slow smoother for input 13' receives higher-order neighbor level compensation.

The resulting "neighbor-compensated" energy levels for each subband of each of the module's inputs are applied to a function or device 437 that calculates a nominal ongoing primary direction of those energy levels. The direction indication may be calculated as the vector sum of the energy-weighted inputs. For a two input module, this simplifies to being the L/R ratio of the smoothed and neighbor-compensated input signal energy levels.

Assume, for example, a planar surround array in which the positions of the channels are given as 2-ples representing x, y coordinates for the case of two inputs. The listener in the center is assumed to be at, say, (0, 0). The left front channel, in normalized spatial coordinates, is at (1, 1). The right front channel is at (−1, 1). If the left input amplitude (Lt) is 4 and the right input amplitude (Rt) is 3, then, using those amplitudes as weighting factors, the nominal ongoing primary direction is:

$$(4*(1, 1)+3*(-1, 1))/(4+3)=(0.143, 1),$$

or slightly to the left of center on a horizontal line connecting Left and Right.

Alternatively, once a master matrix is defined, the spatial direction may be expressed in matrix coordinates, rather than physical coordinates. In that case, the input amplitudes, normalized to sum-square to one, are the effective matrix coordinates of the direction. In the above example, the left and right levels are 4 and 3, which normalize to 0.8 and 0.6. Consequently, the "direction" is (0.8, 0.6). In other words, the nominal ongoing primary direction is a sum-square-to-one-normalized version of the square root of the neighbor-compensated smoothed input energy levels. Block 337 produces the same number of outputs, indicating a spatial direction, as there are inputs to the module (two in this example).

The neighbor-compensated smoothed energy levels for each subband of each of the module's inputs applied to the direction-determining function or device 337 are also applied to a function or device 339 that calculates the neighbor-compensated cross-correlation ("neighbor-compensated_xcor"). Block 339 also receives as an input the averaged common energy of the module's inputs for each subband from slow variable smoother 329, which has been compensated in combiner 335 by higher-order neighbor energy levels, if any. The neighbor-compensated cross-correlation is calculated in block 339 as the higher-order compensated smoothed common energy divided by the Mth root, where M is the number of inputs, of the product of the neighbor-compensated smoothed energy levels for each of the module's input channels to derive a true mathematical correlation value in the range 1.0 to −1.0. Preferably, values from 0 to −1.0 are taken to be zero. Neighbor-compensated_xcor provides an estimate of the cross-correlation that exists in the absence of other modules.

The neighbor-compensated_xcor from block 339 is then applied to a weighting device or function 341 that weights the neighbor-compensated_xcor with the neighbor-compensated direction information to produce a direction-weighted neighbor-compensated cross-correlation ("direction-weighted_xcor"). The weighting increases as the nominal ongoing primary direction departs from a centered condition. In other words, unequal input amplitudes (and, hence, energies) cause a proportional increase in direction-weighted_xcor. Direction-weighted_xcor provides an estimate of image compactness. Thus, in the case of a two input module having, for example, left L and right R inputs, the weighting increases as the direction departs from center toward either left or right (i.e., the weighting is the same in any direction for the same degree of departure from the center). For example, in the case of a two input module, the neighbor-compensated_xcor value is weighted by an L/R or R/L ratio, such that uneven signal distribution urges the direction-weighted_xcor toward 1.0. For such a two-input module, when R>=L.

direction-weighted_xcor=(1-((1-neighbor-compensated_xcor)*(L/R)), and when R<L, direction-weighted_xcor=(1-((1-neighbor-compensated_xcor)*(R/L))

Alternatively, a weighted cross correlation (WgtXcor) may be obtained in other ways. For example:

let A=(|L*L|R*R|)/(|L*L+|R*R|) (normalized input power difference) (where "| . . . |," indicates an averaging), and let B=2*|L*R|/(|L*L|+|R*R|) (normalized input cross power) (where "| . . . |," indicates an averaging).

Then, one may use:

$WgtXcor=A+B,$ or, using sum of squares:

$$WgtXcor=Sqrt\ (A*A+B*B).$$

In either case, WgtXcor approaches 1 as L or R approaches 0, regardless of the value of |L*R|.

For modules with more than two inputs, calculation of the direction-weighted_xcor from the neighbor-weighted_xcor requires, for example, replacing the ratio L/R or R/L in the above by an "evenness" measure that varies between 1.0 and 0. For example, to calculate the evenness measure for any number of inputs, normalize the input signal levels by the total input power, resulting in normalized input levels that sum in an energy (squared) sense to 1.0. Divide each normalized input level by the similarly normalized input level of a signal centered in the array. The smallest ratio becomes the evenness measure. Therefore, for example, for a three-input module with one input having zero level, the evenness measure is zero, and the direction-weighted_xcor is equal to one. (In that case, the signal is on the border of the three-input module, on a line between two of its inputs, and a two-input module (lower in the hierarchy) decides where on the line the nominal ongoing primary direction is, and how wide along that line the output signal should be spread.)

Returning to the description of FIG. 4B, the direction-weighted_xcor is weighted further by its application to a function or device 443 that applies a "random_xcor" weighting to produce an "effective_xcor". Effective_xcor provides an estimate of the input signals' distribution shape.

Random_xcor is the average cross product of the input magnitudes divided by the square root of the average input energies. The value of random_xcor may be calculated by assuming that the output channels were originally module input channels, and calculating the value of xcor that results from all those channels having independent but equal-level signals, being passively downmixed. According to this approach, for the case of a three-output module with two inputs, random_xcor calculates to 0.333, and for the case of a five-output module (three interior outputs) with two inputs, random_xcor calculates to 0.483. The random_xcor value need only be calculated once for each module. Although such random_xcor values have been found to provide satisfactory results, the values are not critical and other values may be employed at the discretion of the system designer. A change in the value of random_xcor affects the dividing line between the two regimes of operation of the signal distribution system, as described below. The precise location of that dividing line is not critical.

The random_xcor weighting performed by function or device 343 may be considered to be a renormalization of the direction-weighted_xcor value such that an effective_xcor is obtained:

effective_xcor=(direction-weighted_xcor-random_xcor)/(1-random_xcor), if direction-weighted_xcor >=random_xcor, effective_xcor=0 otherwise Random_xcor weighting accelerates the reduction in direction-weighted_xcor as direction-weighted_xcor decreases below 1.0, such that when direction-weighted_xcor equals random_xcor, the effective_xcor value is zero. Because the outputs of a module represent directions along an arc or a line, values of effective_xcor less than zero are treated as equal to zero.

Information for controlling the slow smoothers 325, 327 and 329 is derived from the non-neighbor-compensated slow and fast smoothed input channels' energies and from the slow and fast smoothed input channels' common energy. In particular, a function or device 345 calculates a fast non-neighbor compensated cross-correlation in response to the fast smoothed input channels' energies and the fast smoothed input channels' common energy. A function or device 347 calculates a fast non-neighbor compensated direction (ratio or vector, as discussed above in connection with the description of block 337) in response to the fast smoothed input channel energies. A function or device 349 calculates a slow non-neighbor compensated cross-correlation in response to the slow smoothed input channels' energies and the slow smoothed input channels' common energy. A function or device 351 calculates a slow non-neighbor compensated direction (ratio or vector, as discussed above) in response to the slow smoothed input channel energies. The fast non-neighbor compensated cross-correlation, fast non-neighbor compensated direction, slow non-neighbor compensated cross-correlation and slow non-neighbor compensated cross-correlation, along with direction-weighted_xcor from block 341, are applied to a device or function 353 that provides the information for controlling the variable slow smoothers 325, 327 and 329 to adjust their time constants (hereinafter "adjust time constants"). Preferably, the same control information is applied to each variable slow smoother. Unlike the other quantities fed to the time constant selection box, which compare a fast to a slow measure, the direction-weighted_xcor preferably is used without reference to any fast value, such that if the absolute value of the direction-weighted_xcor is greater than a threshold, it may cause adjust time constants 353 to select a faster time constant. Rules for operation of "adjust time constants" 353 are set forth below.

Generally, in a dynamic audio system, it is desirable to use slow time constants as much as possible, staying at a quiescent value, to minimize audible disruption of the reproduced soundfield, unless a "new event" occurs in the audio signal, in which case it is desirable for a control signal to change rapidly to a new quiescent value, then remain at that value until another "new event" occurs. Typically, audio processing systems have equated changes in amplitude with a "new event." However, when dealing with cross products or cross-correlation, newness and amplitude do not always equate: a new event may cause a decrease in the cross-correlation. By sensing changes in parameters relevant to the module's operation, namely measures of cross-correlation and direction, a module's time constants may speed up and rapidly assume a new control state as desired.

The consequences of improper dynamic behavior include image wandering, chattering (a channel rapidly turning on and off), pumping (unnatural changes in level), and, in a multiband embodiment, chirping (chattering and pumping on a band-by-band basis). Some of these effects are especially critical to the quality of isolated channels.

Embodiments such as those of FIGS. 1A and 2A/2B and of FIGS. 1B and 2A'/2B' employ a lattice of decoding modules. Such a configuration results in two classes of dynamics problems: inter- and intra-module dynamics. In addition, the several ways to implement the audio processing (for example wideband, multiband using FFT or MDCT linear filterbank, or discrete filterbank, critical band or otherwise) each require its own dynamic behavior optimization.

The basic decoding process within each module depends on a measure of energy ratios of the input signals and a measure of cross-correlation of the input signals, (in particular, the direction-weighted correlation (direction-weighted_xcor), described above; the output of block 341 in FIG. 4B), which, together, control signal distribution among the outputs of a module. Derivation of such basic quantities requires smoothing, which, in the time domain, requires computing a time-weighted average of the instantaneous values of those quantities. The range of required time constants is quite large: very short (1 msec, for example) for fast transient changes in signal conditions, to very long (150 msec, for example) for low values of correlation, where the instantaneous variation is likely to be much greater than the true averaged value.

A common method of implementing variable time constant behavior is, in analog terms, the use of a "speed-up" diode. When the instantaneous level exceeds the averaged level by a threshold amount, the diode conducts, resulting in a shorter effective time constant. A drawback of this technique is that a momentary peak in an otherwise steady-state input may cause a large change in the smoothed level, which then decays very slowly, providing unnatural emphasis of isolated peaks that would otherwise have little audible consequence.

The correlation calculation described in connection with the embodiment of FIGS. 4A-4C makes the use of speedup diodes (or their DSP equivalent) problematical. For example, all smoothers within a particular module preferably have synchronized time constants, so that their smoothed levels are comparable. Therefore, a global (ganged) time constant switching mechanism is preferred. Additionally, a rapid change in signal conditions is not necessarily associated with an increase in common energy level. Using a speedup diode for this level is likely to produce biased, inaccurate estimates of correlation. Therefore, embodiments of aspects of the present invention preferably use two-stage smoothing without a diode-equivalent speedup. Estimates of correlation and direction may be derived at least from both the first and second stages of the smoothers to set the time constant of the second stage.

For each pair of smoothers (e.g., 319/325), the first stage, the fixed fast stage, time constant may be set to a fixed value, such as 1 msec. The second stage, variable slow stage, time constants may be, for example, selectable among 10 msec (fast), 30 msec (medium), and 150 msec (slow). Although such time constants have been found to provide satisfactory results, their values are not critical and other values may be employed at the discretion of the system designer. In addition, the second stage time constant values may be continuously variable rather than discrete. Selection of the time constants may be based not only on the signal conditions described above, but also on a hysteresis mechanism using a "fast flag", which is used to ensure that once a genuine fast transition is encountered, the system remains in fast mode, avoiding the use of the medium time constant, until the signal conditions re-enable the slow time constant. This may help assure rapid adaptation to new signal conditions.

Selecting which of the three possible second-stage time constants to use may be accomplished by "adjust time constants" 353 in accordance with the following rules for the case of two inputs:

If the absolute value of direction-weighted_xcor is less than a first reference value (0.5, for example) and the absolute difference between fast non-neighbor-compensated_xcor and slow non-neighbor-compensated_xcor is less than the same first reference value, and the absolute difference between the fast and slow direction ratios (each of which has a range +1 to −1) is less than the same first reference value, then the slow second stage time constant is used, and the fast flag is set to True, enabling subsequent selection of the medium time constant.

Else, if the fast flag is True, the absolute difference between the fast and slow non-neighbor-compensated_xcor is greater than the first reference value and less than a second reference value (0.75, for example), the absolute difference between the fast and slow temporary L/R ratios is greater than the first reference value and less than the second reference value, and the absolute value of direction-weighted_xcor is greater than the first reference value and less than the second reference value, then the medium second stage time constant is selected.

Else, the fast second stage time constant is used, and the fast flag is set to False, disabling subsequent use of the medium time constant until the slow time constant is again selected.

In other words, the slow time constant is chosen when all three conditions are less than a first reference value, the medium time constant is chosen when all conditions are between a first reference value and a second reference value and the prior condition was the slow time constant, and the fast time constant is chosen when any of the conditions are greater than the second reference value.

Although the just-stated rules and reference values have been found to produce satisfactory results, they are not critical and variations in the rules or other rules that take fast and slow cross-correlation and fast and slow direction into account may be employed at the discretion of the system designer. In addition, other changes may be made. For example, it may be simpler but equally effective to use diode-speedup type processing, but with ganged operation so that if any smoother in a module is in fast mode, all the other smoothers are also switched to fast mode. It may also be desirable to have separate smoothers for time constant determination and signal distribution, with the smoothers for time constant determination maintained with fixed time constants, and only the signal distribution time constants varied.

Because, even in fast mode, the smoothed signal levels require several milliseconds to adapt, a time delay may be built into the system to allow control signals to adapt before applying them to a signal path. In a wideband embodiment, this delay may be realized as a discrete delay (5 msec, for example) in the signal path. In multiband (transform) versions, the delay is a natural consequence of block processing, and if analysis of a block is performed before signal path matrixing of that block, no explicit delay may be required.

Multiband embodiments of aspects of the invention may use the same time constants and rules as wideband versions, except that the sampling rate of the smoothers may be set to the signal sampling rate divided by the block size, (e.g., the block rate), so that the coefficients used in the smoothers are adjusted appropriately.

For frequencies below 400 Hz, in multiband embodiments, the time constants preferably are scaled inversely to frequency. In the wideband version, this is not possible inasmuch as there are no separate smoothers at different frequencies, so, as partial compensation, a gentle bandpass/preemphasis filter may be applied to the input signal to the control path, to emphasize middle and upper-middle frequencies. This filter may have, for example, a two-pole highpass characteristic with a corner frequency at 200 Hz, plus a 2-pole lowpass characteristic with a corner frequency at 8000 Hz, plus a preemphasis network applying 6 dB of boost from 400 Hz to 800 Hz and another 6 dB of boost from 1600 Hz to 3200 Hz. Although such a filter has been found suitable, the filter characteristics are not critical and other parameters may be employed at the discretion of the system designer.

In addition to time-domain smoothing, multiband versions of aspects of the invention preferably also employ frequency-domain smoothing, as described above in connection with FIG. 4A (frequency smoothers 413, 415 and 417). For each block, the non-neighbor-compensated energy levels may be averaged with a sliding frequency window, adjusted to approximate a 1/3-octave (critical band) bandwidth, before being applied to the subsequent time-domain processing described above. Since the transform-based filterbanks have intrinsically linear frequency resolution, the width of this window (in number of transform coefficients) increases with increasing frequency, and is usually only one transform coefficient wide at low frequencies (below about 400 Hz). Therefore, the total smoothing applied to the multiband processing relies more on time domain smoothing at low frequencies, and frequency-domain smoothing at higher frequencies, where rapid time response is likely to be more necessary at times.

Turning to the description of FIG. 4C, preliminary scale factors (shown as "PSFs" in FIGS. 2 and 2'), which ultimately affect the dominant/fill/endpoint signal distribution, may be produced by a combination of devices or functions 455, 457 and 459 that calculate "dominant" scale factor components, "fill" scale factor components and "excess endpoint energy" scale factor components, respectively, respective normalizers or normalizer functions 361, 363 and 365, and a device or function 367 that takes either the greatest of the dominant and fill scale factor components and/or the additive combination of the fill and excess endpoint energy scale factor components. The preliminary scale factors may be sent to a supervisor, such as supervisor 201 of FIGS. 2A/2B and 2A'/2B' if the module is one of a plurality of modules. Preliminary scale factors may each have a range from zero to one.

Dominant Scale Factor Components

In addition to effective_xcor, device or function 355 ("calculate dominant scale factor components") receives the neighbor-compensated direction information from block 337 and information regarding the local matrix coefficients from a local matrix 369, so that it may determine the N nearest output channels (where N=number of inputs) that can be applied to a weighted sum to yield the nominal ongoing primary direction coordinates and apply the "dominant" scale factor components to them to yield the dominant coordinates. The output of block 355 is either one scale factor component (per subband) if the nominal ongoing primary direction happens to coincide with an output direction or, otherwise, multiple scale factor components (one per the number of inputs per subband) bracketing the nominal ongoing primary direction and applied in appropriate proportions so as to pan or map the dominant signal to the correct virtual location in a power-preserving sense (i.e., for N=2, the two assigned dominant-channel scale factor components should sum-square to effective_xcor).

For a two-input module, all the output channels are in a line or arc, so there is a natural ordering (from "left" to "right"), and it is readily apparent which channels are next to each other. For the hypothetical case discussed above having two input channels and five output channels with sin/cos coefficients as shown, the nominal ongoing primary direction may be assumed to be (0.8, 0.6), between the Middle Left ML channel (0.92, 0.38) and the center C channel (0.71, 0.71). This may be accomplished by finding two consecutive channels where the L coefficient is larger than the nominal ongoing primary direction L coordinate, and the channel to its right has an L coefficient less than the dominant L coordinate.

The dominant scale factor components are apportioned to the two closest channels in a constant power sense. To do this, a system of two equations and two unknowns is solved, the unknowns being the dominant-component scale factor component of the channel to the left of the dominant direction (SFL), and the corresponding scale factor component to the right of the nominal ongoing primary direction (SFR) (these equations are solved for SFL and SFR).

first_dominant_coord=SFL*left-channel matrix value 1+SFR* right-channel matrix value 1 second_dominant_coord=SFL*left-channel matrix value 2+SFR* right-channel matrix value 2

Note that left- and right-channel means the channels bracketing the nominal ongoing primary direction, not the L and R input channels to the module.

The solution is the anti-dominant level calculations of each channel, normalized to sum-square to 1.0, and used as dominant distribution scale factor components (SFL, SFR), each for the other channel. In other words, the anti-dominant value of an output channel with coefficients A, B for a signal with coordinates C, D is the absolute value of AD-BC. For the numerical example under consideration:

Antidom (ML channel)=abs (0.92*0.6−0.38*0.8)=0.248

Antidom (C channel)=abs (0.71*0.6−0.71*0.8)=0.142 (where "abs" indicates taking the absolute value).

Normalizing the latter two numbers to sum-square to 1.0 yields values of 0.8678 and 0.4969 respectively. Thus, switching these values to the opposite channels, the dominant scale factor components are (note that the value of the dominant scale factor, prior to direction weighting, is the square root of effective_xcor):

ML dom sf=0.4969*sqrt (effective_xcor)

C dom sf=0.8678*sqrt (effective_xcor) (the dominant signal is closer to Cout than MidLout).

The use of one channel's antidom component, normalized, as the other channel's dominant scale factor component may be better understood by considering what happens if the nominal ongoing primary direction happens to point exactly at one of the two chosen channels. Suppose that one channel's coefficients are [A, B] and the other channel's coefficients are [C, D] and the nominal ongoing primary direction coordinates are [A, B] (pointing to the first channel), then:

Antidom (first chan)=abs (AB-BA)

Antidom (second chan)=abs (CB-DA)

Note that the first antidom value is zero. When the two antidom signals are normalized to sum-square to 1.0, the second antidom value is 1.0. When switched, the first channel receives a dominant scale factor component of 1.0 (times square root of effective_xcor) and the second channel receives 0.0, as desired.

When this approach is extended to modules with more than two inputs, there is no longer a natural ordering that occurs when the channels are in a line or arc. Once again, block 337 of FIG. 4B, for example, calculates the nominal ongoing primary direction coordinates by taking the input amplitudes, after neighbor compensation, and normalizing them to sum-square to one. Block 455 of FIG. 4B, for example, then identifies the N nearest channels (where N=number of inputs) that can be applied to a weighted sum to yield the dominant coordinates. (Note: distance or nearness can be calculated as the sum of the coordinate differences squared, as if they were (x, y, z) spatial coordinates). Thus, one does not always pick the N nearest channels because they have to be weight-summed to yield the nominal ongoing primary direction.

Figure 5:
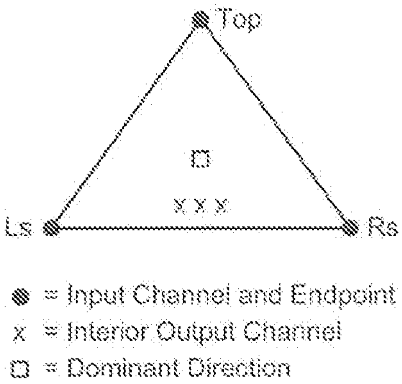
FIG. 5 is a schematic view showing a hypothetical arrangement of a three input module fed by a triangle of input channels, three interior output channels, and a dominant direction. The view is useful in understanding the distribution of dominant signal components.

For example, suppose one has a three input module fed by a triangle of channels: Ls, Rs, and Top as in FIG. 5. Assume there are three interior output channels close together near the bottom of the triangle, with module local matrix coefficients [0.71, 0.69, 0.01], [0.70, 0.70, 0.01], and [0.69 0.71, 0.01], respectively. Assume that the nominal ongoing primary direction is slightly below the center of the triangle, with coordinates [0.6, 0.6, 0.53]. (Note: the middle of the triangle has coordinates [0.5, 0.5, 0.707]). The three nearest channels to the nominal ongoing primary direction are those three interior channels at the bottom, but they do not sum to the dominant coordinates using scale factors between 0 and 1, so instead one chooses two from the bottom and the top endpoint channel to distribute the dominant signal, and solve the three equations for the three weighting factors in order to complete the dominant calculation and proceed to the fill and endpoint calculations.

In the examples of FIGS. 1A and 2A/2B, there is only one three-input module and it is used to derive only one interior channel, which simplifies the calculations.

Fill Scale Factor Components

In addition to effective_xcor, device or function 357 ("calculate fill scale factor components") receives random_xcor, direction-weighted_xcor from block 341, "EQUIAMPL" ("EQUIAMPL" is defined and explained below), and information regarding the local matrix coefficients from the local matrix (in case the same fill scale factor component is not applied to all outputs, as is explained below in connection with FIG. 14B). The output of block 457 is a scale factor component for each module output (per subband).

As explained above, effective_xcor is zero when the direction-weighted_xcor is less than or equal to random_xcor. When direction-weighted_xcor >=random_xcor, the fill scale factor component for all output channels is fill scale factor component=sqrt (1-effective_xcor) *EQUIAMPL Thus, when direction-weighted_xcor=random_xcor, the effective_xcor is 0, so (1-effective_xcor) is 1.0, so the fill amplitude scale factor component is equal to EQUIAMPL (ensuring output power=input power in that condition). That point is the maximum value that the fill scale factor components reach.

When weighted_xcor is less than random xcor, the dominant scale factor component(s) is (are) zero and the fill scale factor components are reduced to zero as the direction-weighted_xcor approaches zero:

fill scale factor component=sqrt (direction-weighted_xcor/random_xcor)*EQUIAMPL

Thus, at the boundary, where direction-weighted_xcor=random_xcor, the fill preliminary scale factor component is again equal to EQUIAMPL, assuring continuity with the results of the above equation for the case of direction-weighted_xcor greater than random_xcor.

Associated with every decoder module is not only a value of random_xcor but also a value of "EQUIAMPL", which is a scale factor value that all the scale factors should have if the signals are distributed equally such that power is preserved, namely:

EQUIAMPL=square_root_of (Number of decoder module input channels/Number of decoder module output channels) For example, for a two-input module with three outputs:

EQUIAMPL=sqrt (2/3)=0.8165 where "sqrt( )" means "square_root_of ( )"For a two-input module with 4 outputs:

EQUIAMPL=sqrt (2/4)=0.7071 For a two-input module with 5 outputs:

EQUIAMPL=sqrt (2/5)=0.6325

Although such EQUIAMPL values have been found to provide satisfactory results, the values are not critical and other values may be employed at the discretion of the system designer. Changes in the value of EQUIAMPL affect the levels of the output channels for the "fill" condition (intermediate correlation of the input signals) with respect to the levels of the output channels for the "dominant" condition (maximum condition of the input signals) and the "all endpoints" condition (minimum correlation of the input signals).

Endpoint Scale Factor Components

In addition to neighbor-compensated_xcor (from block 439, FIG. 4B), device or function 359 ("calculate excess endpoint energy scale factor components") receives the respective 1st through the mth input's smoothed non-neighbor-compensated energy (from blocks 325 and 327) and, optionally, information regarding the local matrix coefficients from the local matrix (in case either or both of the endpoint outputs of the module do not coincide with an input and the module applies excess endpoint energy to the two outputs having directions closest to the input's direction, as discussed further below). The output of block 359 is a scale factor component for each endpoint output if the directions coincide with input directions, otherwise two scale factor components, one for each of the outputs nearest the end, as is explained below.

However, the excess endpoint energy scale factor components produced by block 359 are not the only "endpoint" scale factor components. There are three other sources of endpoint scale factor components (two in the case of a single, stand-alone module):

First, within a particular module's preliminary scale factor calculations, the endpoints are possible candidates for dominant signal scale factor components by block 355 (and normalizer 361).

Second, in the "fill" calculation of block 357 (and normalizer 363) of FIG. 4C, the endpoints are treated as possible fill candidates, along with all the interior channels. Any non-zero fill scale factor component may be applied to all outputs, even the endpoints and the chosen dominant outputs.

Third, if there is a lattice of multiple modules, a supervisor (such as supervisor 201 of the FIGS. 2A/2B and 2A'/2B' examples) performs a final, fourth, assignment of the "endpoint" channels, as described above in connection with FIGS. 2A/2B, 2A'/2B' and 3.

In order for block 459 to calculate the "excess endpoint energy" scale factor components, the total energy at all interior outputs is reflected back to the module's inputs, based on neighbor-compensated_xcor, to estimate how much of the energy of interior outputs is contributed by each input ("interior energy at input 'n'"), and that energy is used to compute the excess endpoint energy scale factor component at each module output that is coincident with an input (i.e., an endpoint).

Reflecting the interior energy back to the inputs is also required in order to provide information needed by a supervisor, such as supervisor 201 of FIGS. 2A/2B and 2A'/2B', to calculate neighbor levels and higher-order neighbor levels. One way to calculate the interior energy contribution at each of a module's inputs and to determine the excess endpoint scale factor component for each endpoint output is shown in FIGS. 6A and 6B.

Figure 6B:
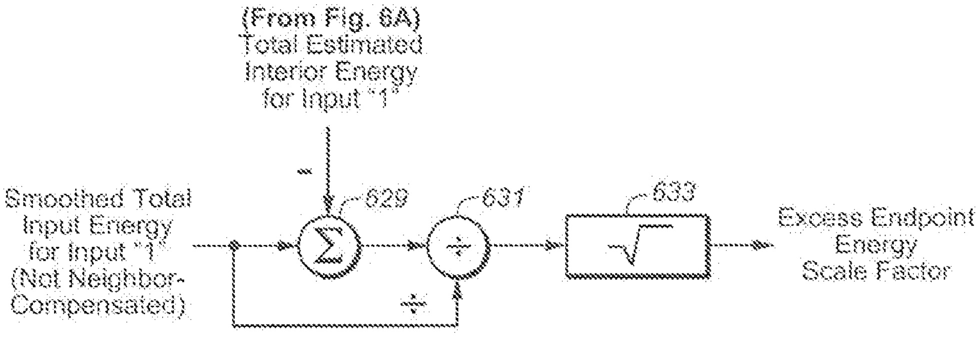
FIGS. 6A and 6B are functional block diagrams showing, respectively, one suitable arrangement for (1) generating the total estimated energy for each input of a module in response to the total energy at each input, and (2) in response to a measure of cross-correlation of the input signals, generating an excess endpoint energy scale factor component for each of the module's endpoints.
Figure 6A:
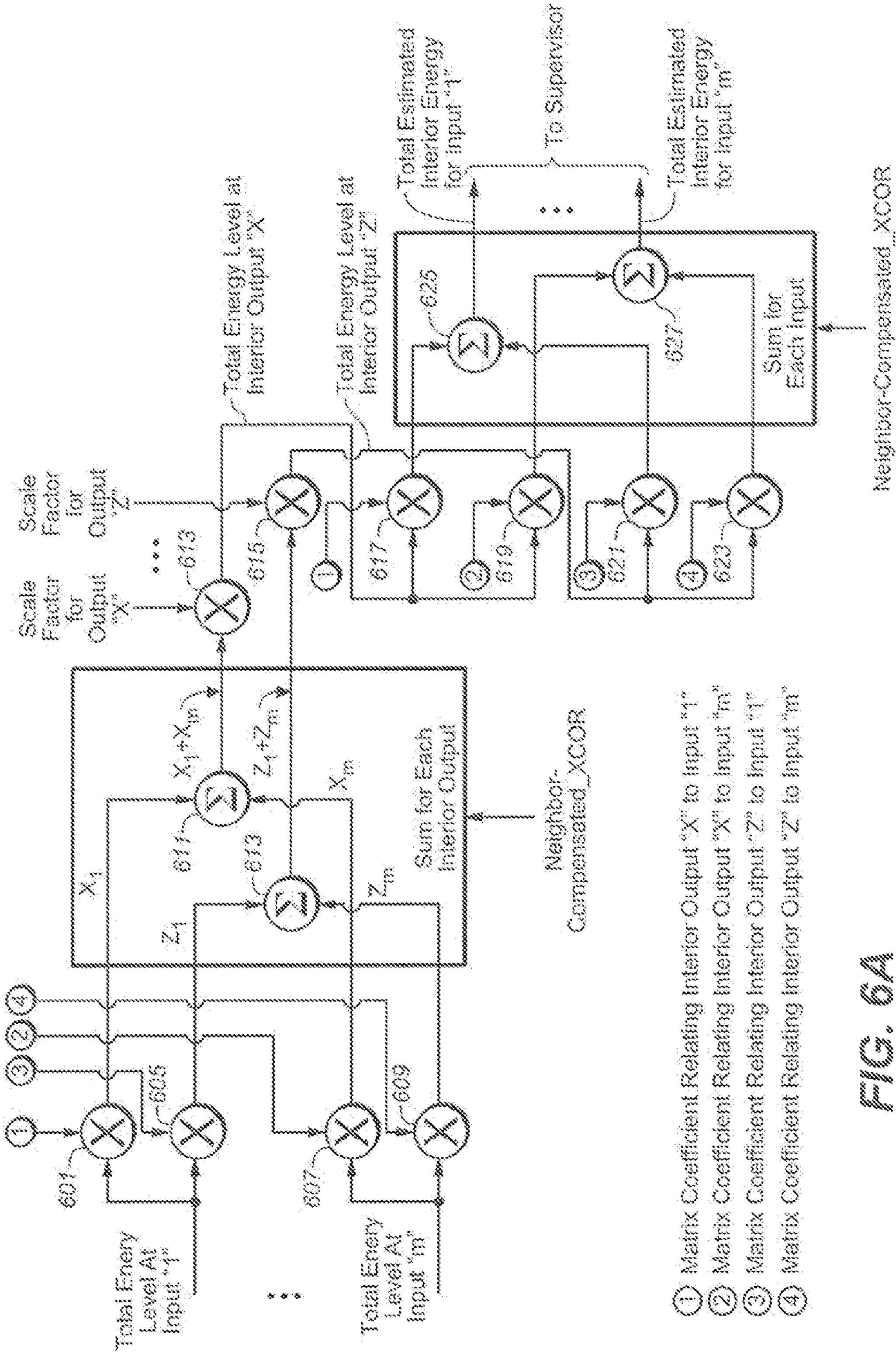

FIGS. 6A and 6B are functional block diagrams showing, respectively, in a module, such as any one of modules 24-34 of FIG. 2A/2B and any one of modules 24-28 and 29'-35' of FIG. 2A'/2B', one suitable arrangement for (1) generating the total estimated interior energy for each input of a module, 1 through m, in response to the total energy at each input, 1 through m, and (2) in response to the neighbor-compensated_xcor (see FIG. 4B, the output of block 439), generating an excess endpoint energy scale factor component for each of the module's endpoints. The total estimated interior energy for each input of a module, (FIG. 6A) is required by the supervisor, in the case of a multiple module arrangement, and, in any case, by the module itself in order to generate the excess endpoint energy scale factor components.

Using the scale factor components derived in blocks 455 and 457 of FIG. 4C, along with other information, the arrangement of FIG. 6A calculates the total estimated energy at each interior output (but not its endpoint outputs). Using the calculated interior output energy levels, it multiples each output level by the matrix coefficient relating that output to each input ["m" inputs, "m" multipliers], which provides the energy contribution of that input to that output. For each input, it sums all the energy contributions of all the interior output channels to obtain the total interior energy contribution of that input. The total interior energy contribution of each input is reported to the supervisor and is used by the module to calculate the excess endpoint energy scale factor component for each endpoint output.

Referring to FIG. 6A in detail, the smoothed total energy level for each module input (not neighbor-compensated, preferably) is applied to a set of multipliers, one multiplier for each of the module's interior outputs. For simplicity in presentation, FIG. 6A shows two inputs, "1" and "m" and two interior outputs "X" and "Z". The smoothed total energy level for each module input is multiplied by a matrix coefficient (of the module's local matrix) that relates the particular input to one of the module's interior outputs (note that the matrix coefficients are their own inverses because matrix coefficients sum square to one). This is done for every combination of input and interior output. Thus, as shown in FIG. 6A, the smoothed total energy level at input 1 (which may be obtained, for example at the output of the slow smoother 425 of FIG. 4B) is applied to a multiplier 601 that multiplies that energy level by a matrix coefficient relating interior output X to input 1, providing a scaled output energy level component X1 at output X. Similarly, multipliers 603, 605 and 607 provide scaled energy level components Xm, Z1 and Zm.

The energy level components for each interior output (e.g., X1 and Xm; Z1 and Zm) are summed in combiners 611 and 613 in an amplitude/power manner in accordance with neighbor-compensated_xcor. If the inputs to a combiner are in phase, indicated by a neighbor-weighted cross correlation of 1.0, their linear amplitudes add. If they are uncorrelated, indicated by a neighbor-weighted cross correlation of zero, their energy levels add. If the cross-correlation is between one and zero, the sum is partly an amplitude sum and partly a power sum. In order to sum properly the inputs to each combiner, both the amplitude sum and the power sum are calculated and weighted by neighbor-compensated_xcor and (1-neighbor-weighted_xcor), respectively. In order to obtain the weighted sum, either the square root of the power sum is taken, to obtain an equivalent amplitude, or the linear amplitude sum is squared to obtain its power level before doing the weighted sum. For example, taking the latter approach (weighted sum of powers), if the amplitude levels are 3 and 4 and neighbor-weighted_xcor is, the amplitude sum is 3+4=7, or a power level of 49 and the power energy sum is 9+16=25. So the weighted sum is 0.7*49+(1−0.7)*25=41.8 (power energy level) or, taking the square root, 6.47.

The summation products (X1+Xm; Z1+Zm) are multiplied by the scale factor components for each of the outputs, X and Z, in multipliers 613 and 615 to produce the total energy level at each interior output, which may be identified as X' and Z'. The scale factor component for each of the interior outputs is obtained from block 467 (FIG. 4C). Note that the "excess endpoint energy scale factor components" from block 459 (FIG. 4C) do not affect interior outputs and are not involved in the calculations performed by the FIG. 6A arrangement.

The total energy level at each interior output, X' and Z' is reflected back to respective ones of the module's inputs by multiplying each by a matrix coefficient (of the module's local matrix) that relates the particular output to each of the module's inputs. This is done for every combination of interior output and input. Thus, as shown in FIG. 6A, the total energy level X' at interior output X is applied to a multiplier 617 that multiplies the energy level by a matrix coefficient relating interior output X to input 1 (which is the same as its inverse, as noted above), providing a scaled energy level component X1' at input 1.

It should be noted that when a second order value, such as the total energy level X', is weighted by a first order value, such as a matrix coefficient, a second order weight is required. This is equivalent to taking the square root of the energy to obtain an amplitude, multiplying that amplitude by the matrix coefficient and squaring the result to get back to an energy value.

Similarly, multipliers 619, 621 and 623 provide scaled energy levels Xm', Z1' and Zm'. The energy components relating to each output (e.g., X1' and Z1', Xm' and Zm') are summed in combiners 625 and 627 in an amplitude/ power manner, as described above in connection with combiners 611 and 613, in accordance with neighbor-compensated_x-cor. The outputs of combiners 625 and 627 represent the total estimated interior energy for inputs 1 and m, respectively. In the case of a multiple module lattice, this information is sent to the supervisor, such as supervisor 201 of FIGS. 2A/2B and 2A'/2B', so that the supervisor may calculate neighbor levels. The supervisor solicits all the total interior energy contributions of each input from all the modules connected to that input, then informs each module, for each of its inputs, what the sum of all the other total interior energy contributions was from all the other modules connected to that input. The result is the neighbor level for that input of that module. The generation of neighbor level information is described further below.

The total estimated interior energy contributed by each of inputs 1 and m are also required by the module in order to calculate the excess endpoint energy scale factor component for each endpoint output. FIG. 6B shows how such scale factor component information may be calculated. For simplicity in presentation, only the calculation of scale factor component information for one endpoint is show, it being understood that a similar calculation is performed for each endpoint output. The total estimated interior energy contributed by an input, such as input 1, is subtracted in a combiner or combining function 629 from the smoothed total input energy for the same input, input 1 in this example (the same smoothed total energy level at input 1, obtained, for example at the output of the slow smoother 425 of FIG. 4B, which is applied to a multiplier 601). The result of the subtraction is divided in divider or dividing function 631 by the smoothed total energy level for the same input 1. The square root of the result of the division is taken in a square rooter or square rooting function 633. It should be noted that the operation of the divider or dividing function 631 (and other dividers described herein) should include a test for a zero denominator. In that case, the quotient may be set to zero.

If there is only a single stand-alone module, the endpoint preliminary scale factor components are thus determined by virtue of having determined the dominant, fill and excess endpoint energy scale factors.

Thus, all output channels including endpoints have assigned scale factors, and one may proceed to use them to perform signal path matrixing. However, if there is a lattice of multiple modules, each one has assigned an endpoint scale factor to each input feeding it, so each input having more than one module connected to it has multiple scale factor assignments, one from each connected module. In this case, the supervisor (such as supervisor 201 of the FIGS. 2A/2B and 2A'/2B' examples) performs a final, fourth, assignment of the "endpoint" channels, as described above in connection with FIGS. 2A/2B, 2A'/2B' and 3 that the supervisor determines final endpoint scale factors that override all the scale factor assignments made by individual modules as endpoint scale factors.

In practical arrangements, there is no certainty that there is actually an output channel direction corresponding to an endpoint position, although this is often the case. If there is no physical endpoint channel, but there is at least one physical channel beyond the endpoint, the endpoint energy is panned to the physical channels nearest the end, as if it were a dominant signal component. In a horizontal array, this is the two channels nearest to the endpoint position, preferably using a constant-energy distribution (the two scale factors sum-square to 1.0). In other words, when a sound direction does not correspond to the position of a real sound channel, even if that direction is an endpoint signal, it is preferred to pan it to the nearest available pair of real channels, because if the sound slowly moved, it jumps suddenly from one output channel to another. Thus, when there is no physical endpoint sound channel, it is not appropriate to pan an endpoint signal to the one sound channel closest to the endpoint location unless there is no physical channel beyond the endpoint, in which case there is no choice other than to the one sound channel closes to the endpoint location.

Another way to implement such panning is for the supervisor, such as supervisor 201 of FIGS. 2A/2B and 2A'/2B' to generate "final" scale factors based on an assumption that each input also has a corresponding output channel (i.e., each corresponding input and output are coincident, representing the same location). Then, an output matrix, such as the variable matrix 203 of FIG. 2A/B or FIG. 2A'/2B', may map an output channel to one or more appropriate output channels if there is no actual output channel that directly corresponds to an input channel.

As mentioned above, the outputs of each of the "calculate scale factor component" devices or functions 455, 457 and 459 are applied to respective normalizing devices or functions 461, 463 and 465. Such normalizers are desirable because the scale factor components calculated by blocks 455, 457 and 459 are based on neighbor-compensated levels, whereas the ultimate signal path matrixing (in the master matrix, in the case of multiple modules, or in the local matrix, in the case of a stand-alone module) involves non-neighbor-compensated levels (the input signals applied to the matrix are not neighbor-compensated). Typically, scale factor components are reduced in value by a normalizer.

One suitable way to implement normalizers is as follows. Each normalizer receives the neighbor-compensated smoothed input energy for each of the module's inputs (as from combiners 331 and 333), the non-neighbor-compensated smoothed input energy for each of the module's inputs (as from blocks 325 and 327), local matrix coefficient information from the local matrix, and the respective outputs of blocks 355, 357 and 359. Each normalizer calculates a desired output for each output channel and an actual output level for each output channel, assuming a scale factor of 1. It then divides the calculated desired output for each output channel by the calculated actual output level for each output channel and takes the square root of the quotient to provide a potential preliminary scale factor for application to "sum and/or greater of" 367. Consider the following example.

Assume that the smoothed non-neighbor compensated input energy levels of a two-input module are 6 and 8, and that the corresponding neighbor-compensated energy levels are 3 and 4. Assume also a center interior output channel having matrix coefficients=(0.71, 0.71), or squared: (0.5, 0.5). If the module selects an initial scale factor for this channel (based on neighbor-compensated levels) of 0.5, or squared=0.25, then the desired output level of this channel (assuming pure energy summation for simplicity and using neighbor-compensated levels) is:

$$0.25*(3*0.5+4*0.5)=0.875.$$

Because the actual input levels are 6 and 8, if the above scale factor (squared) of 0.25 is used for the ultimate signal path matrixing, the output level is $$0.25*(6*0.5+8*0.5)=1.75$$

instead of the desired output level of 0.875. The normalizer adjusts the scale factor to get the desired output level when non-neighbor compensated levels are used.

Actual output, assuming SF=1=(6*0.5+8*0.5)=7. (Desired output level)/(Actual output assuming SF=1)=0.875/7.0=0.125=final scale factor squared Final scale factor for that output channel=sqrt (0.125) =0.354, instead of the initially calculated value of 0.5.

Figure 7:
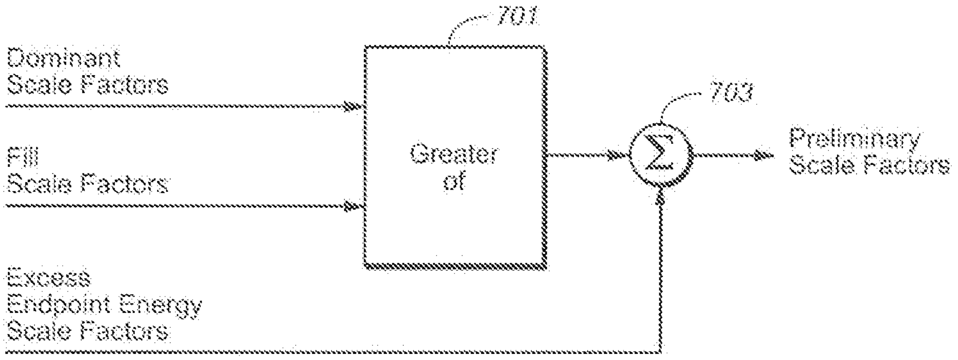
FIG. 7 is a functional block diagram showing a preferred function of the "sum and/or greater of" block 367 of FIG. 4C.

The "sum or and/or greatest of" 367 preferably sums the corresponding fill and endpoint scale factor components for each output channel per subband, and, selects the greater of the dominant and fill scale factor components for each output channel per subband. The function of the "sum and/or greater of" block 367 in its preferred form may be characterized as shown in FIG. 7. Namely, dominant scale factor components and fill scale factor components are applied to a device or function 701 that selects the greater of the scale factor components for each output ("greater of" 701) and applies them to an additive combiner or combining function 703 that sums the scale factor components from greater of 701 with the excess endpoint energy scale factors for each output. Alternatively, acceptable results may be obtained when the "sum and/or greatest of" 467: (1) sums in both Region 1 and Region 2, (2) takes the greater of in both Region 1 and Region 2, or (3) selects the greatest of in Region 1 and sums in Region 2.

Figure 8:
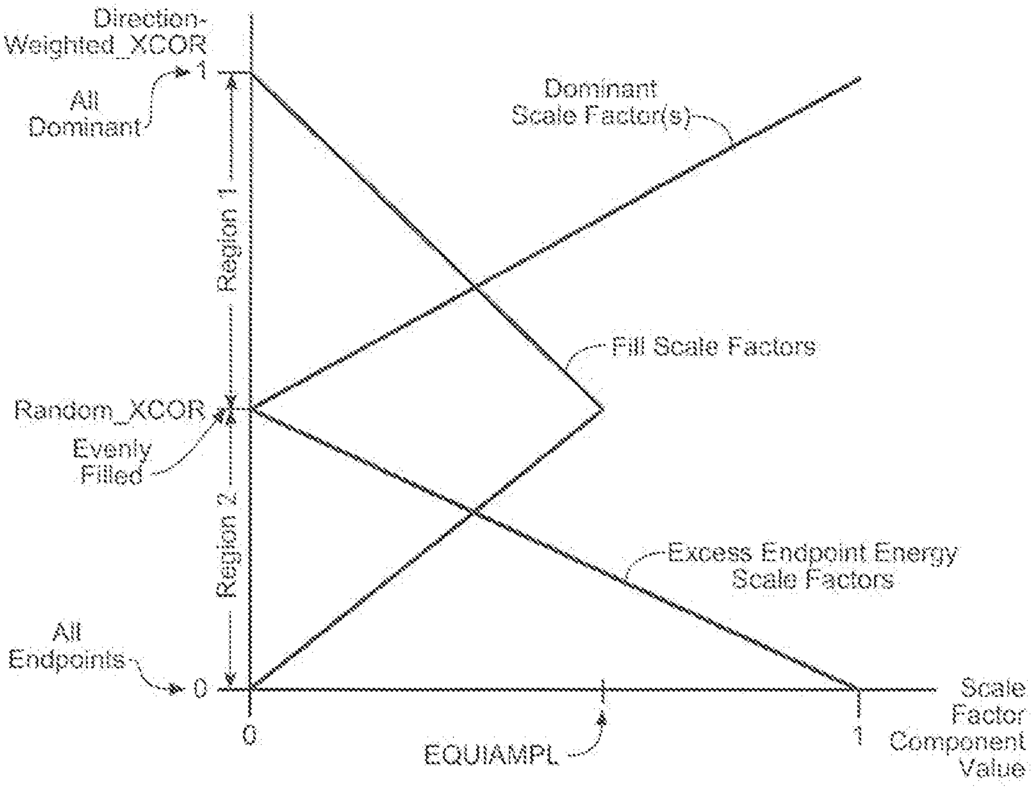
FIG. 8 is an idealized representation of the manner in which an aspect of the present invention generates scale factor components in response to a measure of cross-correlation.

FIG. 8 is an idealized representation of the manner in which an aspect of the present invention generates scale factor components in response to a measure of cross-correlation. The figure is particularly useful for reference to FIGS. 9A and 9B through FIGS. 16A and 16B examples. As mentioned above, the generation of scale factor components may be considered as having two regions or regimes of operation: a first region, Region 1, bounded by "all dominant" and "evenly filled" in which the available scale factor components are a mixture of dominant and fill scale factor components, and a second region, Region 2, bounded by "evenly filled" and "all endpoints" in which the available scale factor components are a mixture of fill and excess endpoint energy scale factor components. The "all dominant" boundary condition occurs when the direction-weighted_xcor is one. Region 1 (dominant plus fill) extends from that boundary to the point where the direction-weighted_xcor is equal to random_xcor, the "evenly filled" condition. The "all endpoints" boundary condition occurs when the direction-weighted_xcor is zero. Region 2 (fill plus endpoint) extends from the "evenly filled" boundary condition to the "all endpoint" boundary condition. The "evenly filled" boundary point may be considered to be in either Region 1 or Region 2. As mentioned below, the precise boundary point is not critical.

As illustrated in FIG. 8, as the dominant scale factor component(s) decline in value, the fill scale factor components increase in value, reaching a maximum as the dominant scale factor component(s) reach a zero value, at which point as the fill scale factor components decline in value, the excess endpoint energy scale factor components increase in value. The result, when applied to an appropriate matrix that receives the module's input signals, is an output signal distribution that provides a compact sound image when the input signals are highly correlated, spreading (widening) from compact to broad as the correlation decreases, and progressively splitting or bowing outward into multiple sound images, each at an endpoint, from broad, as the correlation continues to decrease to highly uncorrelated.

Although it is desirable that there be a single spatially compact sound image (at the nominal ongoing primary direction of the input signals) for the case of full correlation and a plurality of spatially compact sound images (each at an endpoint) for the case of full uncorrelation, the spatially spread sound image between those extremes may be achieved in ways other than as shown in the illustration of FIG. 8. It is not critical, for example, that the fill scale factor component values reach a maximum for the case of random_xcor=direction-weighted_xcor, nor that the values of the three scale factor components change linearly as shown. Modifications of the FIG. 8 relationships (and the equations expressed herein that underlie the figure) and other relationships between a suitable measure of cross-correlation and scale factor values that are capable of producing the compact dominant to broad spread to compact endpoints signal distribution for a measure of cross-correlation from highly correlated to highly uncorrelated are also contemplated by the present invention. For example, instead of obtaining a compact dominant to broad spread to compact endpoints signal distribution by employing a dual region approach such as described above, such results may be obtained by a mathematical approach, such as one employing pseudo-inverse-based equation solving.

Output Scale Factor Examples

A series of idealized representations, FIGS. 9A and 9B through FIGS. 16A and 16B, illustrate the output scale factors of a module for various examples of input signal conditions. For simplicity, a single, stand-alone module is assumed so that the scale factors it produces for a variable matrix are the final scale factors. The module and an associated variable matrix have two input channels (such as left L and right R) that coincide with two endpoint output channels (that may also be designated L and R). In this series of examples, there are three interior output channels (such as left middle Lm, center C, and right middle Rm).

The meanings of "all dominant", "mixed dominant and fill", "evenly filled", "mixed fill and endpoints", and "all endpoints" are further illustrated in connection with the examples of FIGS. 9A and 9B through 16A and 16B. In each pair of FIGS. 9A and 9B, for example), the "A" figure shows the energy levels of two inputs, left L and right R and the "B" figure shows scale factor components for the five outputs, left L, left middle LM, center C, right middle RM and right R. The figures are not to scale.

Figure 9A:
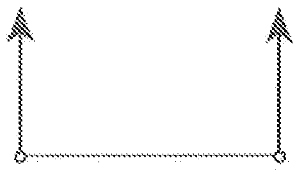
Figure 9B:
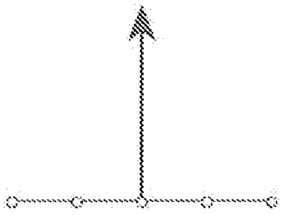

In FIG. 9A, the input energy levels, shown as two vertical arrows, are equal. In addition, both the direction-weighted_xcor (and the effective_xcor) is 1.0 (full correlation). In this example, there is only one non-zero scale factor, shown in FIG. 9B as a single vertical arrow at C, which is applied to the center interior channel C output, resulting in a spatially compact dominant signal. In this example, the output is centered (L/R=1) and, thus, happens to coincide with the center interior output channel C. If there is no coincident output channel, the dominant signal is applied in appropriate proportions to the nearest output channels so as to pan the dominant signal to the correct virtual location between them. If, for example, there were no center output channel C, the left middle LM and right middle RM output channels would have non-zero scale factors, causing the dominant signal to be applied equally to LM and RM outputs. In this case of full correlation (all dominant signal), there are no fill and no endpoint signal components. Thus, the preliminary scale factors produced by block 467 (FIG. 4C) are the same as the normalized dominant scale factor components produced by block 361.

Figure 10A:
Figure 10B:
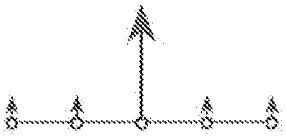

In FIG. 10A, the input energy levels are equal, but direction-weighted_xcor is less than 1.0 and more than random_xcor. Consequently, the scale factor components are that of Region 1-mixed dominant and fill scale factor components. The greater of the normalized dominant scale factor component (from block 361) and the normalized fill scale factor component (from block 363) is applied to each output channel (by block 367) so that the dominant scale factor is located at the same central output channel C as in FIG. 10B, but is smaller, and the fill scale factors appear at each of the other output channels, L, LM, RM and R (including the endpoints L and R).

Figure 11A:
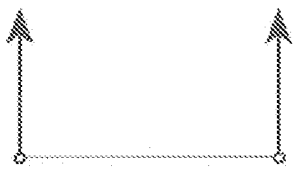
Figure 11B:

In FIG. 11A, the input energy levels remain equal, but direction-weighted_xcor=random_xcor. Consequently, the scale factors, FIG. 11B, are that of the boundary condition between Regions 1 and 2-the evenly filled condition in which there are no dominant or endpoint scale factors, just fill scale factors having the same value at each output (hence, "evenly filled"), as indicated by the identical arrows at each output. The fill scale factor levels reach their highest value in this example. As discussed below, fill scale factors may be applied unevenly, such as in a tapered manner depending on input signal conditions.

Figure 12A:
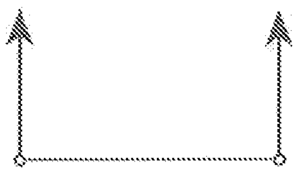
Figure 12B:
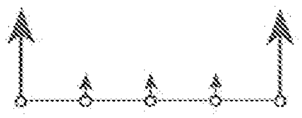

In FIG. 12A, the input energy levels remain equal, but direction-weighted_xcor is less than random_xcor and greater than zero (Region 2). Consequently, as shown in FIG. 12B, there are fill and endpoint scale factors, but no dominant scale factors.

Figure 13A:
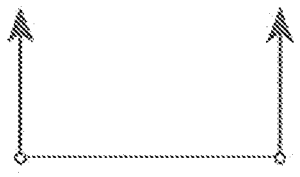
Figure 13B:
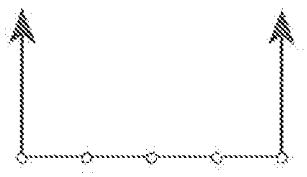

In FIG. 13A, the input energy levels remain equal, but direction-weighted_xcor is zero. Consequently, the scale factors, shown in FIG. 13B, are that of the all endpoints boundary condition. There are no interior output scale factors, only endpoint scale factors.

In the examples of FIGS. 9A/9B through 13A/13B, because the energy levels of the two inputs are equal, the direction-weighted_xcor (such as produced by block 441 of FIG. 4B) is the same as the neighbor-compensated_xcor (such as produced by block 439 of FIG. 4B). However, in FIG. 14A, the input energy levels are not equal (L is greater than R). Although the neighbor-weighted_xcor is equal to random_xcor in this example, the resulting scale factors, shown in FIG. 14B, are not fill scale factors applied evenly to all channels as in the example of FIGS. 11A and 11B. Instead, the unequal input energy levels cause a proportional increase in the direction-weighted_xcor (proportional to the degree to which the nominal ongoing primary direction departs from its central position) such that it becomes greater than the neighbor-compensated_xcor, thereby causing the scale factors to be weighted more towards all dominant (as illustrated in FIG. 8). This is a desired result because strongly L- or R-weighted signals should not have broad width; they should have a compact width near the L or R channel endpoint. The resulting output, shown in FIG. 14B, is a non-zero dominant scale factor located closer to the L output than the R output (the neighbor-compensated direction information, in this case, happens to locate the dominant component precisely at the left middle LM position), reduced fill scale factor amplitudes, and no endpoint scale factors (the direction weighting pushes the operation into Region 1 of FIG. 8 (mixed dominant and fill)).

Figure 14A:
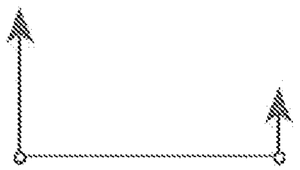
Figure 14B:
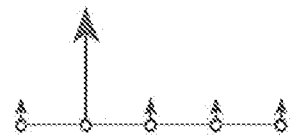

For the five outputs corresponding to the scale factors of FIG. 14B, the outputs may be expressed as:

Lout=Lt ($SF_L$)

MidLout=((0.92) Lt+(0.38) Rt)) ($SF_{MidL}$)

Cout=((0.45) Lt+(0.45) Rt)) ($SF_C$)

MidRout=((0.38) Lt+(0.92) Lt)) ($SF_{MidR}$)

Rout=Rt ($SF_R$).

Thus, in the FIG. 14B example, even though the scale factors (SF) for each of the four outputs other than MidLout are equal (fill), the corresponding signal outputs are not equal because Lt is larger than Rt (resulting in more signal output toward the left) and the dominant output at Mid Left is larger than the scale factor indicates. Because the nominal ongoing primary direction is coincident with the MidLeft output channel, the ratio of Lt to Rt is the same as the matrix coefficients for the MidLeft output channel, namely 0.92 to 0.38. Assume that those are the actual amplitudes for Lt and Rt. To calculate the output levels, one multiplies these levels by the corresponding matrix coefficients, adds, and scales by the respective scale factors:

output amplitude (output_channel_sub_i)=sf (i)*(Lt_Coeff(i)*Lt+Rt_Coeff(i)*Rt)

Although one preferably takes into account the mix between amplitude and energy addition (as in the calculations relating to FIG. 6A), in this example cross-correlation is fairly high (large dominant scale factor) and ordinary summation may be performed:

Lout=0.1*(1*0.92+0*0.38)=0.092

MidLout=0.9*(0.92*0.92+0.38*0.38)=0.900

Cout=0.1*(0.71*0.92+0.71*0.38)=0.092

MidRout=0.1*(0.38*0.92+0.92*0.38)=0.070

Rout=0.1*(0*0.92+1*0.38)=0.038

Thus, this example demonstrates that the signal outputs at the Lout, Cout, MidRout and Rout are unequal because Lt is larger than Rt even though the scale factors for those outputs are equal.

The fill scale factors may be equally distributed to the output channels as shown in the examples of FIGS. 10B, 11B, 12B and 14B. Alternatively, the fill scale factor components, rather than being uniform, may be varied with position in some manner as a function of the dominant (correlated) and/or endpoint (uncorrelated) input signal components (or, equivalently, as a function of the direction-weighted_xcor value.) For example, for moderately high values of direction-weighted_xcor, the fill scale factor component amplitudes may curve convexly, such that output channels near the nominal ongoing primary direction receive more signal level than channels farther away. For direction-weighted_xcor=random_xcor, the fill scale factor component amplitudes may flatten to an even distribution, and for direction-weighted_xcor<random_xcor, the amplitudes may curve concavely, favoring channels near the endpoint directions.

Figure 15A:
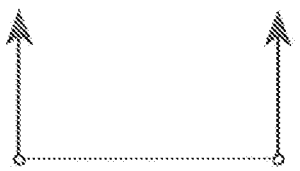
Figure 15B:
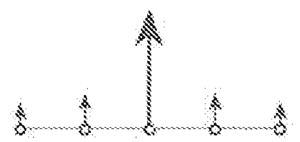
Figure 16A:
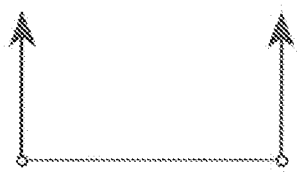
Figure 16B:
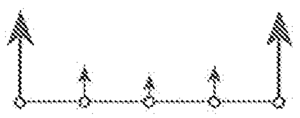

Examples of such curved fill scale factor amplitudes are set forth in FIG. 15B and FIG. 16B. The FIG. 15B output results from an input (FIG. 15A) that is the same as in FIG. 10A, described above. The FIG. 16B output results from an input (FIG. 16A) that is the same as in FIG. 12B, described above.

Communication Between Module and Supervisor

With regard to Neighbor Levels and Higher-Order Neighbor Levels

Each module in a multiple-module arrangement, such as the example of FIGS. 1A and 2 and the example of FIGS. 1B and 2', requires two mechanisms in order to support communication between it and a supervisor, such as supervisor 201 of FIGS. 2 and 2':

(a) one to cull and report the information required by the supervisor to calculate neighbor levels and higher-order neighbor levels (if any). The information required by the supervisor is the total estimated interior energy attributable to each of the module's inputs as generated, for example, by the arrangement of FIG. 6A.

(b) another to receive and apply the neighbor levels (if any) and higher-order neighbor levels (if any) from the supervisor. In the example of FIG. 4B, the neighbor levels are subtracted in respective combiners 431 and 433 from the smoothed energy levels of each input, and the higher-order neighbor levels (if any) are subtracted in respective combiners 431, 433 and 435 from the smoothed energy levels of each input and the common energy across the channels.

Once a supervisor knows all the total estimated interior energy contributions of each input of each module:

(1) it determines if the total estimated interior energy contributions of each input (summed from all the modules connected to that input) exceeds the total available signal level at that input. If the sum exceeds the total available, the supervisor scales back each reported interior energy reported by each module connected to that input so that they sum to the total input level.

(2) it informs each module of its neighbor levels at each input as the sum of all the other interior energy contributions of that input (if any).

Higher-order (HO) neighbor levels are neighbor levels of one or more higher-order modules that share the inputs of a lower-level module. The above calculation of neighbor levels relates only to modules at a particular input that have the same hierarchy: all the three-input modules (if any), then all the two-input modules, etc. An HO-neighbor level of a module is the sum of all the neighbor levels of all the higher order modules at that input. (i.e., the HO neighbor level at an input of a two-input module is the sum of all the third, fourth, and higher order modules, if any, sharing the node of a two-input module). Once a module knows what its HO-neighbor levels are at a particular one of its inputs, it subtracts them, along with the same-hierarchy-level neighbor levels, from the total input energy level of that input to get the neighbor-compensated level at that input node. This is shown in FIG. 4B where the neighbor levels for input 1 and input m are subtracted in combiners 431 and 433, respectively, from the outputs of the variable slow smoothers 425 and 427, and the higher-order neighbor levels for input 1, input m and the common energy are subtracted in combiners 431, 433 and 435, respectively, from the outputs of the variable slow smoothers 425, 427 and 429.

One difference between the use of neighbor levels and HO-neighbor levels for compensation is that the HO-neighbor levels also are used to compensate the common energy across the input channels (e.g., accomplished by the subtraction of an HO-neighbor level in combiner 435). The rationale for this difference is that the common level of a module is not affected by adjacent modules of the same hierarchy, but it can be affected by a higher-order module sharing all the inputs of a module.

For example, assume input channels Ls (left surround), Rs (right surround), and Top, with an interior output channel in the middle of the triangle between them (elevated ring rear), plus an interior output channel on a line between Ls and Rs (main horizontal ring rear), the former output channel needs a three-input module to recover the signal common to all three inputs. Then, the latter output channel, being on a line between two inputs (Ls and Rs), needs a two-input module. However, the total common signal level observed by the two-input module includes common elements of the three input module that do not belong to the latter output channel, so one subtracts the square root of the pairwise products of the HO neighbor levels from the common energy of the two-input module to determine how much common energy is due solely to its interior channel (the latter one mentioned). Thus, in FIG. 4B, the smoothed common energy level (from block 429) has subtracted from it the derived HO common level to yield a neighbor-compensated common energy level (from combiner 435) that is used by the module to calculate (in block 439) the neighbor-compensated_xcor.

The present invention and its various aspects may be implemented in analog circuitry, or more probably as software functions performed in digital signal processors, programmed general-purpose digital computers, and/or special purpose digital computers. Interfaces between analog and digital signal streams may be performed in appropriate hardware and/or as functions in software and/or firmware. Although the present invention and its various aspects may involve analog or digital signals, in practical applications most or all processing functions are likely to be performed in the digital domain on digital signal streams in which audio signals are represented by samples.

It should be understood that implementation of other variations and modifications of the invention and its various aspects will be apparent to those skilled in the art, and that the invention is not limited by these specific embodiments described. It is therefore contemplated to cover by the present invention any and all modifications, variations, or equivalents that fall within the true spirit and scope of the basic underlying principles disclosed and claimed herein.

The invention claimed is:

1. A method for translating a first plurality of audio input channels to a second plurality of audio output channels, the method comprising:

receiving, by an audio processor decoder module, the first plurality of audio input channels;

determining an input/output-mapping matrix for mapping at least a first set of the first plurality of audio input channels to at least a second set of the second plurality of audio output channels, wherein the input/output-mapping matrix is a mixing matrix, wherein each matrix element of the input/output-mapping matrix is a transfer function relating to mapping an input channel i of the first plurality of audio input channels to an output channel j of the second plurality of audio output channels; and deriving the second plurality of audio output channels based on the first plurality of audio input channels and the input/output-mapping matrix, wherein at least one coefficient of the input/output-mapping matrix is computed based at least in part on a cross-correlation of pair-wise coded audio input signals, wherein the cross-correlation is based at least in part on a cross power value for the pair-wise coded audio input signals, wherein the deriving of the second plurality of audio output channels based on first plurality of audio input channels causes a soundfield represented by the first plurality of audio input channels to be determined and reproduced, and wherein the first plurality of audio input channels represents a same soundfield represented by the second plurality of audio output channels;

wherein a total number of audio input channels in the first plurality of audio input channels equals a total number of audio output channels in the second plurality of audio output channels.

2. A non-transitory computer readable storage medium containing instructions that when executed by a processor perform the method of claim 1.

3. A system for translating a first plurality of audio input channels to a second plurality of audio output channels, the system comprising:

a receiver for receiving the first plurality of audio input channels;

a first processor for determining an input/output-mapping matrix for mapping at least a first set of the first plurality of audio input channels to at least a second set of the second plurality of audio output channels, wherein the input/output-mapping matrix is a mixing matrix, wherein each matrix element of the input/output-mapping matrix is a transfer function relating to mapping an input channel i of the first plurality of audio input channels to an output channel j of the second plurality of audio output channels; and and a second processor for deriving the second plurality of audio output channels based on the first plurality of audio input channels and the input/output-mapping matrix, wherein at least one coefficient of the input/output-mapping matrix is computed based at least in part on a cross-correlation of pair-wise coded audio input signals, wherein the cross-correlation is based at least in part on a cross power value for the pair-wise coded audio input signals, wherein the deriving of the second plurality of audio output channels based on first plurality of audio input channels causes a soundfield represented by the first plurality of audio input channels to be determined and reproduced, and wherein the first plurality of audio input channels represents a same soundfield represented by the second plurality of audio output channels;

wherein a total number of audio input channels in the first plurality of audio input channels equals a total number of audio output channels in the second plurality of audio output channels.

* * * * *